(12) United States Patent
Nakata

(10) Patent No.: US 6,754,445 B2
(45) Date of Patent: Jun. 22, 2004

(54) BLUR DETECTION APPARATUS AND BLUR DETECTION METHOD

(75) Inventor: Koichi Nakata, Kokubunji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/295,272

(22) Filed: Nov. 15, 2002

(65) Prior Publication Data

US 2003/0095797 A1 May 22, 2003

(30) Foreign Application Priority Data

Nov. 16, 2001 (JP) .................................... 2001-352114

(51) Int. Cl.[7] .............................................. G03B 5/00
(52) U.S. Cl. ..................................... 396/54; 396/121
(58) Field of Search ................................ 396/121–123

(56) References Cited

U.S. PATENT DOCUMENTS 5,084,722 A * 1/1992 Taniguchi et al. ............ 396/92
5,262,820 A * 11/1993 Tamai et al. .................. 396/54
5,314,572 A    5/1994 Core et al.
5,561,496 A * 10/1996 Sugiura et al. ............. 399/107

FOREIGN PATENT DOCUMENTS

| JP | 55-106444    | 8/1980 |
| JP | 2001-033870  | 2/2001 |
| JP | 2001-165622  | 6/2001 |

* cited by examiner

Primary Examiner—W. B. Perkey
(74) Attorney, Agent, or Firm—Straub & Pokotylo; John C. Pokotylo

(57) ABSTRACT

Positional shifts of subject images in plural areas of a light receiving surface are respectively detected in a blur detection apparatus for a camera for detecting blur based on chronological positional shifts of subject images on a light receiving surface. This allows blur of the main subject to be distinguished from that in the background in the image. The subject image position may be detected using an AF sensor. An acceleration sensor may be used for detecting blur in images with insufficient brightness or contrast. Blur detection by the acceleration sensor should account for a time interval between accelerations—one detected in one direction and the other in the opposite direction.

9 Claims, 15 Drawing Sheets

FIG. 5A
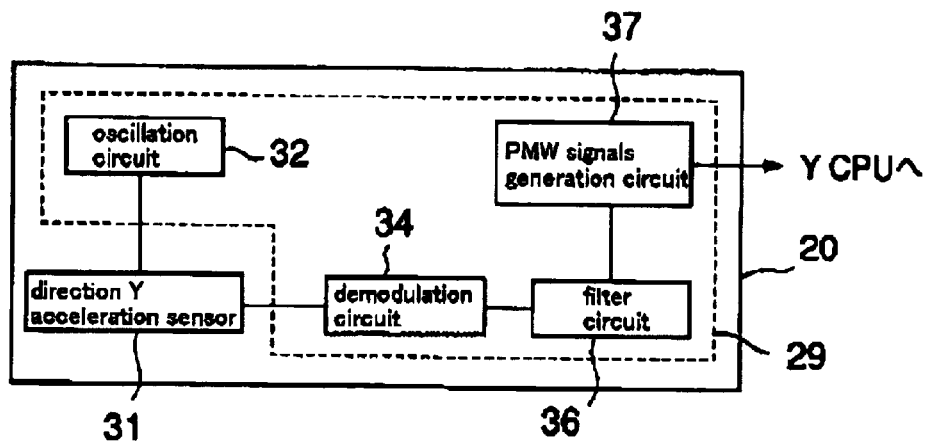
FIG. 5B
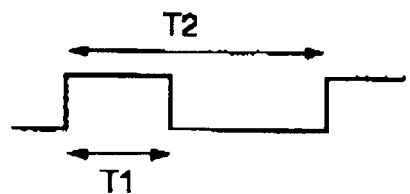
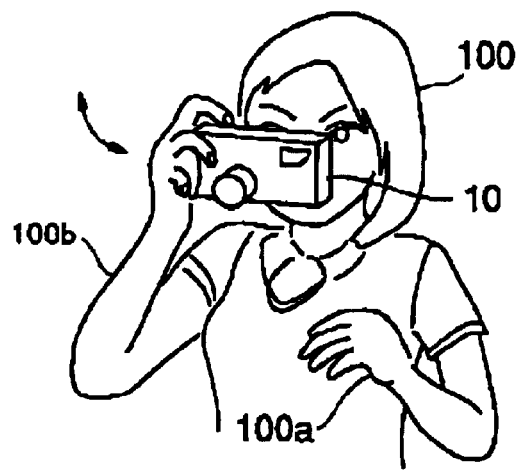
FIG. 6A
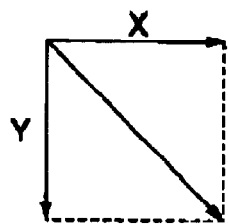
FIG. 6B

BLUR DETECTION APPARATUS AND BLUR DETECTION METHOD

CROSS-REFFERENCE TO RELATED APPLICATION

This application is based upon and claims the benefit of priority from the prior Japanese Patent Application No. 2001-352114, filed Nov. 16, 2001: the entire contents of the application are incorporated herein by reference.

BACKGROUND OF THE INVENTION

1. Description of the Invention The present invention relates to a blur detection apparatus, particularly to a blur detection apparatus for detecting blur from an unsteady hold on the camera during photographing.

2. Description of the Related Art

In general, when a camera is held in the hands to take a photograph, the camera may be shaken during the exposure particularly where low shutter speeds are required. This is responsible for so-called blur which appears in unsuccessful photographs.

To prevent blurring, various vibration prevention techniques have been proposed. The vibration prevention techniques consist of two parts: a part for detecting vibrations and a part for dealing with the detected vibrations. The latter further comprises a warning technique for informing the user of vibrating conditions and a technique for preventing or correcting deterioration in images due to blurring.

Japanese Patent Publication No. 2001-33870 discloses a technique for warning of blurring wherein a blur warning is displayed on a display element in the finder or on a body that display element is originally meant for displaying photography and date information.

Japanese Patent Publication No. SHO55-106444 discloses a technique for detecting blurring that uses an optical sensor, not a mechanical sensor.

Japanese Patent Publication No. 2001-165622 discloses a technique for detecting blurring using an optical sensor wherein the detection area of the sensor is changed according to the distance to a subject.

However, erroneous detections are often observed.

BRIEF SUMMARY OF THE INVENTION

The blur detection apparatus according to the present invention performs detection of blur on each of plural areas of a light receiving surface of a light receiving element when it detects the blur from a subject image's positional shifts with time. This allows distinguishing of positional shift of the main subject from that of miscellaneous subjects in the image, realizing precise blur detection.

Preferably, an AF (auto focus) sensor (as an optical sensor) of a camera is used for detecting subject images. This eliminates the need of dedicated detection apparatus, advantageously reducing cost. If the camera is a digital camera, an image pick-up element can also be used.

In preferred applications, only the image position shift in the center part of the light receiving element is used for evaluating blur because the main subjects usually locates in the center of the frame. In this case, image position shifts in the other areas can be used to distinguish blur from other image position shifts such as compositional arrangement change. Of course, more complex logic may also be adaptable. For example, the result of AF ranging data may be used to evaluate the blur since the main subject often locates near to the camera.

Preferably, areas used for evaluating blur are changed depending on the photographic mode or focal length.

The use of image signals for detecting camera movements as described above is not suitable for subjects with insufficient brightness or contrast. A mechanical sensor is preferably integrated and an appropriate blur detection process is selected depending on the subject's brightness or contrast.

A mechanical sensor and a sensor working on image signals react differently to movements of the camera. Thus, a mechanical sensor that detects in one direction and a sensor working on image signals that detects in another direction are preferably combined.

When a mechanical acceleration sensor is used, the elapsed time between the detection of acceleration in one direction and acceleration in the opposite direction enables the estimate of the magnitude of blurring.

The camera according to the present invention is defined as an apparatus with an image pick-up function and undoubtedly includes dedicated apparatus such as film camera, digital cameras, and video cameras. In addition, PDAs, personal computers, and cellular phones, which are provided with an image pick-up function, and their image pick-up units are also included.

BRIEF DESCRIPTION OF THE SEVERAL VIEWS OF THE DRAWING

These and other features, aspects, and advantages of the apparatus and methods of the present invention will become better understood with reference to the following description, appended claims, and accompanying drawings where:

FIG. 5A is a block diagram of an exemplary structure of the processing circuit of FIG. 4C.

FIG. 5B is an illustration of an output waveform from the processing circuit of FIG. 4C.

FIG. 6A and FIG. 6B are illustrations used to show how blurring occurs in a camera regarding the embodiments of the present invention.

DETAILED DESCRIPTION OF THE INVENTION

Figure 1A:
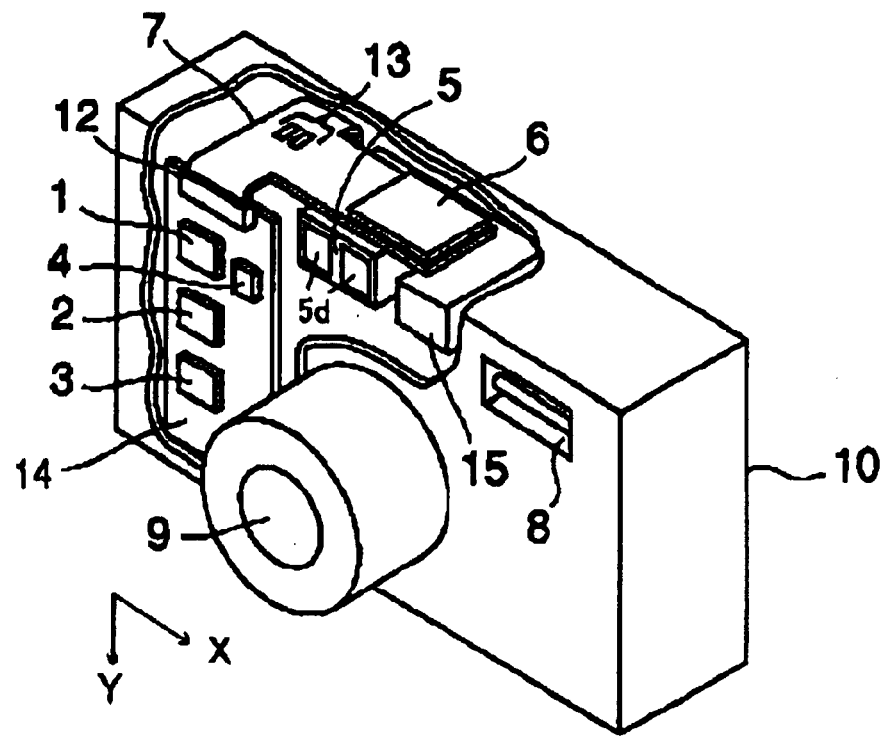
FIG. 1A is a partially cutaway perspective view showing the appearance and the internal structure of the camera relative to the embodiments of the present invention.

Preferred embodiments of the present invention are described hereafter with reference to the drawings.

This embodiment applies the apparatus for detecting blur of a compact, AF zoom camera 10. The camera 10 comprises an AF sensor 5 and an acceleration sensor 3 that is a monolithic acceleration meter used as a blur detection part to detect vibrations from unsteady holding of the camera 10. The camera 10 further comprises, as a blur warning part, an in-finder LCD 6a (a liquid crystal display part provided in the finder of the camera), a warning display part 11 such as a LED (light emitting diode) provided near the ocular part of the camera body, and a self-timer display LED 65 provided on the front surface of the camera body. The primary functions of the liquid crystal display part 6a provided in the finder of the camera include displaying the panoramic photographic range by changing the transmittance of liquid crystal at the top and bottom regions of the finer view field to shade these regions when the panoramic photographic mode is selected and making the finder view field totally shaded when the release is pushed. A technique is introduced in this embodiment wherein the transmittance of the display regions of the liquid crystal display part is changed to a certain pattern to let the user recognize blur.

FIG. 1A is a partially cutaway perspective view showing the appearance and the internal structure of the camera 10 relating to this embodiment.

The camera 10 is provided with a camera lens 9, a strobe 8, a finder objective lens 15, and the AP (auto focus) sensor 5 on the body front surface. The AF sensor 5 includes a pair of light receiving lenses 5d. The camera 10 is also provided with a display element (LCD) 6 on the body top surface.

Inside the camera 10, electronic circuits are provided for operating the camera 10 in a fully automatic manner. The electronic circuits are mainly disposed on a hard printed board 14 and a flexible board 7 connected to the hard printed board 14 via a connector 12.

The acceleration sensor (acceleration IC) 3 that is a monolithic acceleration meter described above, a one-chip microcomputer (CPU) 1 for controlling entire photographic operations in the camera 10, and an interface IC (IFIC) 2 for activating actuators such as motors to drive mechanical mechanism parts are mounted on the hard printed board 14. In addition, a memory 4, such as a EEPROM for storing data such as data used for adjusting variations of parts in the course of camera assembly is provided near the CPU 1.

Display element (LCD) 6 and AF sensor 5 are mounted on the flexible board 7. A pattern of communication lines (not shown) and switches 13 are also formed on the flexible board 7.

Figure 1B:
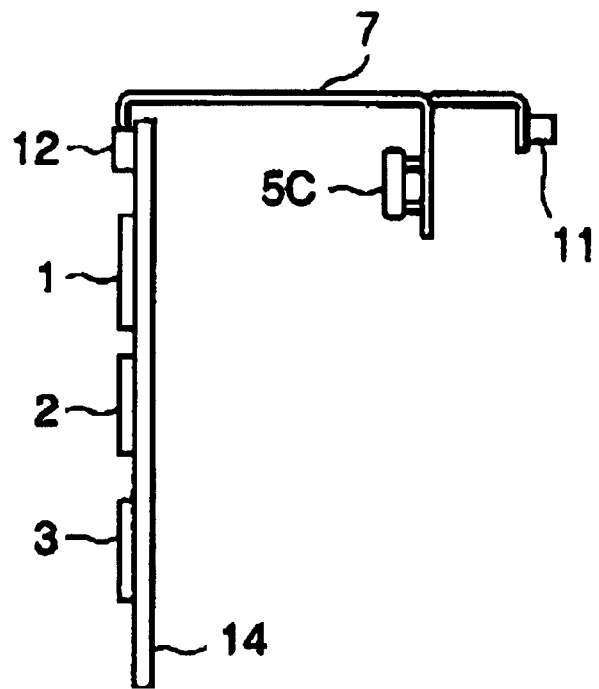
FIG. 1B is a side view showing the positional relationship between a hard printed board and a flexible printed board (hereafter termed flexible board) used in the embodiments of the present invention.

FIG. 1B is a side view of the camera 10 of FIG. 1A with the major elements removed to show the relationship between the hard printed board 14 and the flexible board 7. Since the hard printed board 14 cannot be bent along the inner curved surface of the camera 10, the flexible board 7 is used where bending is required. These two boards 14 and 7 are connected to each other via the connector 12.

The flexible board 7 extends to the back of the camera 10 where a warning display part 11 including a notification element such as a pronunciation element PCV or LED is mounted. Sensor arrays 5c of the AF sensor 5 are also mounted on the flexible board 7. The warning display part 11 and AF sensor 5 send and receive signals to and from the CPU 1.

Figure 1C:
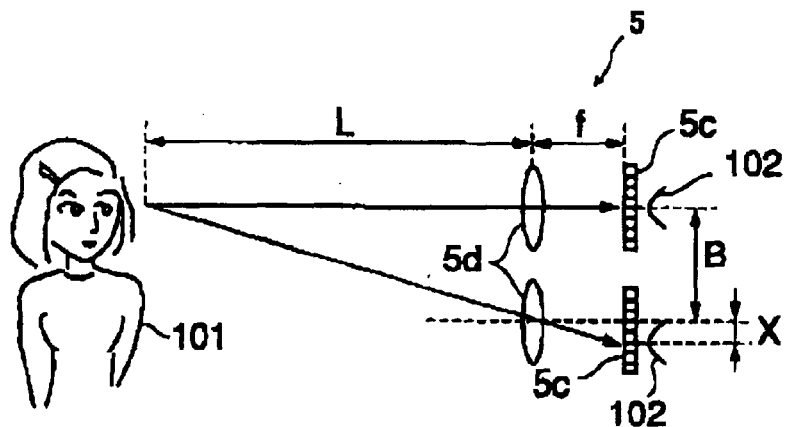
FIG. 1C is an illustration used to explain the ranging optical system of the present invention.

FIG. 1C is an illustration used to explain the ranging measurement of the AF sensor 5. The AF sensor 5 uses triangulation to obtain the distance to a subject 101. Facing an object that is distanced by the distance L, there is the pair of light receiving lenses 5d followed by the pair of sensor arrays 5c. The optical axis of the lenses 5d are separated by space B. The light receiving lenses 5d have a focal length 'f'. Image signals 102 of the subject 101 are detected by the pairs of light receiving lenses 5d and sensor arrays 5c. The relative positional difference X in the image signals 102 formed on the pair of sensor arrays 5c is used to calculate the distance to the subject 101 L by triangulation.

The subject 101 usually has shadows in the vertical direction. Therefore, the AF sensor 5 has the two light receiving lens 5d juxtaposed in the lateral (X) direction as shown in FIG. 1A. The sensor arrays 5c also are laterally divided.

Originally, the AF sensor 5 is used to measure the distance to the subject 101 L to focus the camera lens 9. However, when the camera 10 is subject to blurring from an unstable hold on the camera 10, image shifts occur on the sensor arrays 5c. Image shifts in the direction X caused by the blur in the lateral direction can be detected by the AF sensor 5. This is advantageously used in this embodiment where blur in the direction X is detected by the AF sensor 5.

On the other hand, blur in the direction Y as shown in FIG. 1A is detected by the acceleration sensor (acceleration IC) 3 that is a monolithic acceleration meter in this embodiment. An acceleration sensor 3 is, as shown in FIG. 2B, provided in the direction in which it can detect blur in the direction Y. In this way, this embodiment uses separate sensors which, in a complementary manner, detect blur in the directions X and Y.

The acceleration sensor 3 is described next. A monolithic acceleration meter is a device on an IC chip for detecting acceleration using capacitance changes generated between mobile and immobile patterns. A monolithic acceleration meter is disclosed for example in U.S. Pat. No. 5,314,572.

The monolithic acceleration meter disclosed in the U.S. patent above includes both of the patterns made of polysilicon members on silicon board. The mobile pattern electrode is movable and responsive to accelerations while the immobile patter electrode remains still against accelerations. In this state, a pair of capacitors that react to acceleration in an opposite way to each other is formed.

When acceleration is applied to the silicon board, one capacitor has increased capacitance and the other has decreased capacitance. These differential capacitances are detected and processed by a signal processing circuit. The signal processing circuit is monolithically formed on the same board as the mobile electrode and capacitor.

This embodiment uses the acceleration sensor 3 that is a monolithic acceleration meter element described above. A shock sensor for detecting shocks can also be used in place of the monolithic acceleration meter element.

Figure 3A:
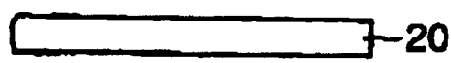
FIG. 3A through FIG. 3E are illustrations that show an example of part of the production process of the acceleration IC in FIG. 2A.
Figure 3B:
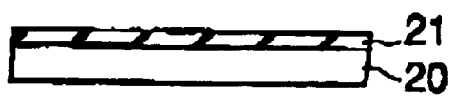

FIG. 3A through FIG. 3E show an example of a production process of the acceleration sensor 3. First, as shown in FIG. 3B, an oxide film 21 is formed on a silicon board (IC chip) 20 shown in FIG. 3A. Then, a photo resist mask pattern is formed on the oxide film 21.

Figure 3C:
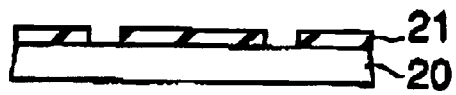

Then, as shown in FIG. 3C, part of the oxide film 21 exposed over the photo resist mask is removed by etching to form openings at arbitrary positions after the resist mask is removed.

Figure 3D:
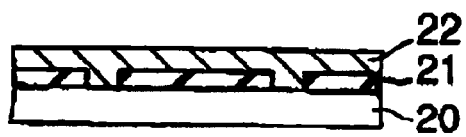
Figure 3E:
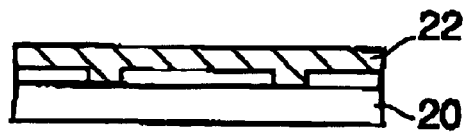

Then, as shown in FIG. 3D, a poly silicon layer 22 is deposited on the board. Subsequently, as shown in FIG. 3E, the oxide film 21 is selectively removed by wet etching to form a bridge structure of poly silicon layer 22 on the silicon board 20. The poly silicon layer 22 is doped with impurities such as phosphorus to make it conductive.

Figure 4A:
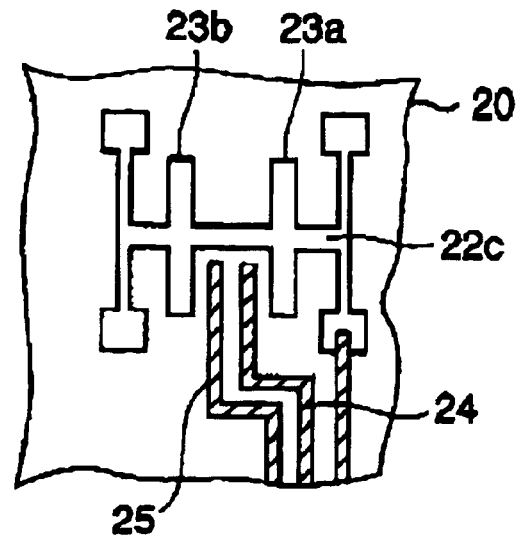
FIG. 4A through FIG. 4C are illustrations that show the respective structures of the acceleration IC produced by the production process of FIG. 3A through FIG. 3E.
Figure 4B:
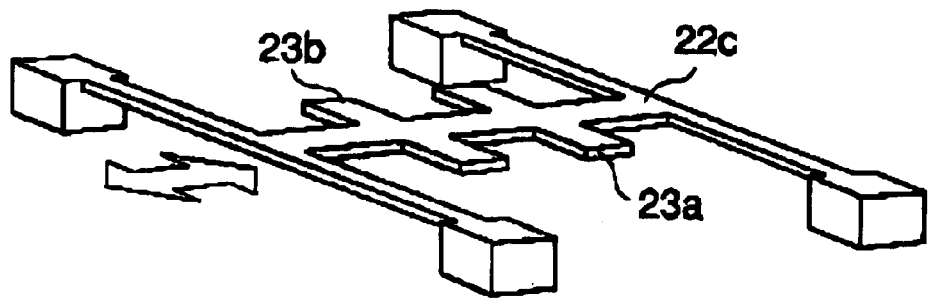

FIG. 4B shows respective structures of the acceleration sensor 3 manufactured as described above. First, with the bridge structure as described above, a mobile electrode 22c having four supports at the corners is formed on the silicon board 20. The mobile electrode 22c has arms 23a and 23b.

As shown in FIG. 4A, other electrodes 24 and 25 are formed on the silicon board 20, adjacent to the arms 23a and 23b of the mobile electrode 22c so that a pair of micro capacitance capacitors is created between the arm 23a and the electrode 24 and between the arm 23b and electrode 25.

Figure 4C:
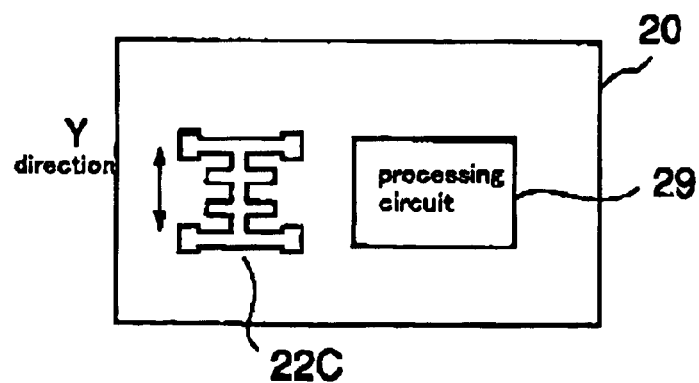

Furthermore, as shown in FIG. 4C, the mobile electrode structure 22c and a processing circuit 29 are mounted on the silicon board 20 to create an IC chip, which is a monolithic IC having a processing circuit capable of detecting acceleration in a certain direction. The processing circuit 29 detects capacitances that change as the mobile electrode 22c shifts, and provides signals in accordance with accelerations.

When the bridge of the mobile electrode 22c is moved by acceleration in the direction indicated by the arrow in FIG. 4B, one of the two capacitors formed by the two electrodes has increased capacitance and the other has reduced capacitance. This capacitance change is electrically detected to detect acceleration in the direction indicated by the arrow in FIG. 4B.

In this embodiment, the IC chip detection direction above coincides with the direction Y when it is mounted in a camera so that it can detect acceleration in the direction Y, as shown in FIG. 2B.

FIG. 5A is a block diagram which shows an exemplary structure of the processing circuit 29.

A direction Y acceleration sensor 31 for detecting movement in the direction Y has the arms 23a and 23b and the electrodes 24 and 26 so that the capacitance elements are formed between the arm 23a and electrode 24 and between the arm 23b and electrode 25, respectively, as described above. Movement of the arms 23a and 23b changes the capacitances.

The processing circuit 29 transforms capacitance changes into electric signals. The processing circuit 29 comprises a carrier wave generator (oscillation circuit) 32 for oscillating a carrier wave of pulse waveform, a demodulation circuit 34 for demodulating oscillated waveforms that are modified through capacitance changes of the direction Y acceleration sensor 31 by full-wave switching rectification, a filter circuit 36 for providing acceleration-dependent analog signals, and a PWM (pulse width modulation) signals generation circuit 37 for analog-PWM transforming.

FIG. 5B is an illustration showing an output waveform from the processing circuit 29. The pulse duty ratio (the ratio of the half cycle T1 to the whole cycle T2 of output waveform in FIG. 5B) changes in relation to the acceleration detected by the direction Y acceleration sensor 31. Therefore, the acceleration sensor 3 provides pulse width modulated (PWM) signals in proportion to the acceleration. Other structures may be employed to provide other signals, for example voltage signals, in place of the PWM signals. In the embodiment where PWM signals are used, the CPU 1 (the CPU 1 can process only digital signals) uses, for example, a built-in counter to demodulate PWM signals for detecting acceleration. In the embodiment where voltage signals proportional to acceleration are used, an A/D transformer is employed to transform voltage signals into digital signals, which the CPU 1 can process.

As described above, using PWM signals advantageously eliminates the need of an A/D transformer that otherwise should be mounted on the CPU 1 or signals processing circuit 29.

Figure 2A:
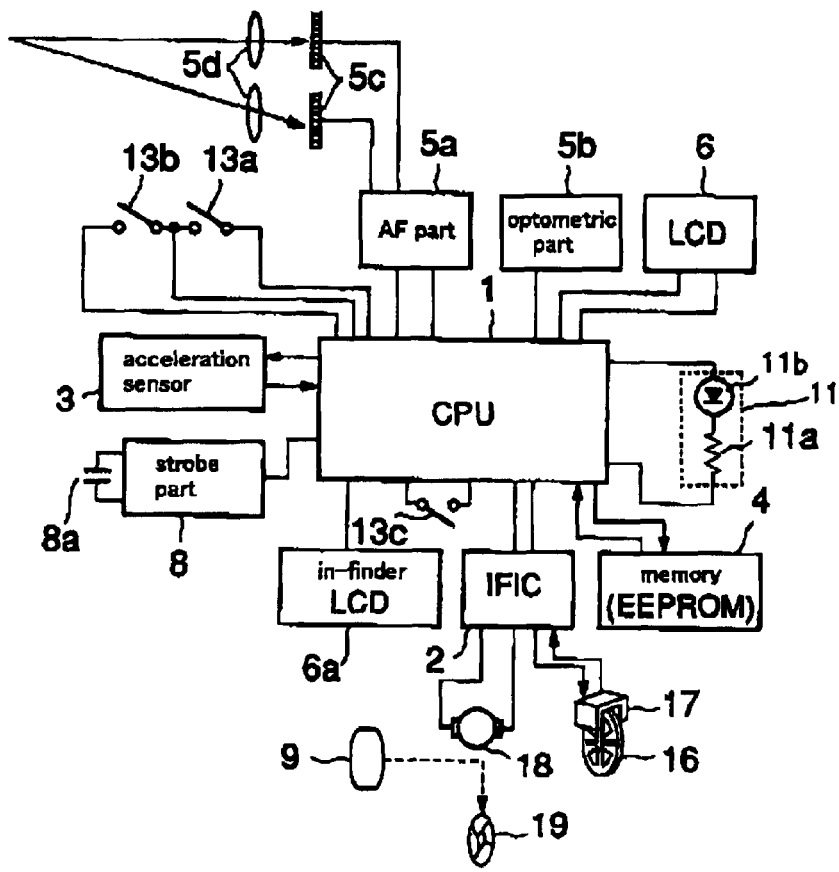
FIG. 2A is a block diagram of a control system including electronic circuits for a camera relating to the embodiments of the present invention.
Figure 2B:
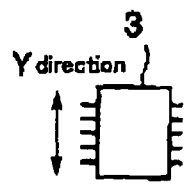
FIG. 2B is an illustration used to explain the direction detectable by an acceleration sensor (acceleration IC) that is a monolithic acceleration meter in FIG. 2A.

FIG. 2A is a block diagram which shows the structure of the control system including electronic circuits for the camera 10 in which the acceleration sensor 3 above is mounted.

FIG. 2A shows the CPU 1, in the center, that controls the entire camera 10. The acceleration sensor 3 that is a monolithic acceleration meter for detecting blur in the direction Y, which is described above, is connected to the CPU 1. An AF part 5a that is a processing circuit of the AF sensor 5 for measuring the distance to a subject and detecting blur in the direction X is also connected to the CPU 1.

In addition, the IFIC 2, the memory 4, for example EEPROM, for storing data, including adjustment data, an optometric part 5b for detecting illumination of the subject, the liquid crystal display element (LCD) 6 for displaying information including camera settings and photographing, an in-finder LCD 6a provided in the finder for displaying information regarding photographing, and a strobe part 8 that includes an illumination tube for emitting supplementary light are also connected to the CPU 1.

Furthermore, a warning display part 11 that includes an LED 11b connected in series to a resistor 11a is connected to the CPU. Switches 13a (first release switch) and 13b (second release switch) for starting the photographing sequence of the camera 10, and a mode change switch 13c for switching to the blur mode are connected to the CPU 1 as well.

A main capacitor 8a for applying electrical charges to the illumination tube for illumination is connected to the strobe part 8. A motor 18 for driving the driven mechanisms such as film feeding and a photo interrupter 17 for optically detecting holes of a rotor blade 16 that rotates in relation to the motor 18 are connected to the IFIC 2.

The CPU 1 also controls a shutter 19 provided behind the camera lens 9.

In the embodiment shown, the motor 18 can be switched by a switching mechanism to drive the driven mechanisms such as the camera lens 9 and shutter 19. In alternate embodiments, each driving mechanism can be provided with an individual motor.

In the structure above, the CPU 1 controls the photographing sequence of the camera 10 in accordance with the states of the switches 13a and 13b.

In the photographic sequence, warnings are displayed on the blur warning parts including the in-finder LCD 6a for blur warning. Upon photography, the AF part 5a that includes the AF ranging part and the optometric part 5b for measuring the brightness of the subject for exposure control are activated and the motor 18 is controlled via the IFIC 2 after the necessary signals are received. In this embodiment, the motor 18 performs multiple functions including the driving of the camera lens 9 and shutter 19. The rotation of the motor 18 is transmitted to the rotor blade 16. The IFIC 2 rectifies the waveform of signals that the photo interrupter 17 outputs in accordance with the presence/absence and positions of holes of the rotor blade 16. Then, the CPU 1 monitors the rotation of the motor 18 based on the output signal from the IFIC 2. The strobe part 8 emits supplementary light if necessary.

Vibrations of the camera 10 having the structure above is explained with reference to FIG. 6A. As shown in FIG. 6A, when a user 100 holds the camera 10 with one hand 100b, the camera 10 tends to be subject to slight vibrations in the diagonal direction. This vibration can be decomposed into movements in the directions X and Y.

Generally, users are unaware of "blur" caused by such slight vibrations on the photography. Users can take precautions to reduce vibrations for example by attaching his/her other hand 100a to the camera 10 if the camera 10 detects such slight vibrations and gives a warning. This allows for photographs with no or minimal blur damage.

Blur warnings are described hereafter. This embodiment gives a blur warning on the in-finder LCD 6a (the liquid crystal display part provided in the camera finder), the display element (LCD) 6 provided on the top surface of the camera body, the waning display part 11 such as an LED provided near the finder ocular part 61 of the camera body, and the self-timer display LED 65 provided on the front surface of the camera body.

Among them, the in-finder LCD (liquid crystal display) part 6a gives a blur warning using the in-finder LCD 6a originally intended for distinguishing the panoramic photographic mode from regular photographic mode and for blacking out to inform the user that the shutter 19 has been released.

Figure 14:
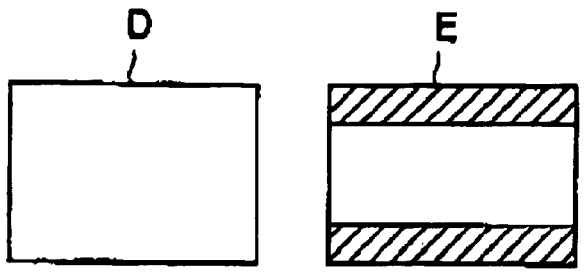
FIG. 14 is an illustration that shows an example of normal display pattern displayed on the in-finder LCD. The left side is for a regular photographic mode and the right side is for a panoramic photographic mode.

FIG. 14 is an illustration which shows an example of normal display patterns that are displayed on the in-finder LCD 6a. The liquid crystal does not transmit light in the shaded areas in the figure and, therefore, they are seen as black by the user. D is the regular photographic mode where the entire view field is transmissive. E is the panoramic photograph mode where the top and bottom parts of the view field are shaded and the center of the view field is transmissive. Though not shown in the figure, the top, center, and bottom parts are all temporally shaded when the shutter 19 is released.

Figure 13:
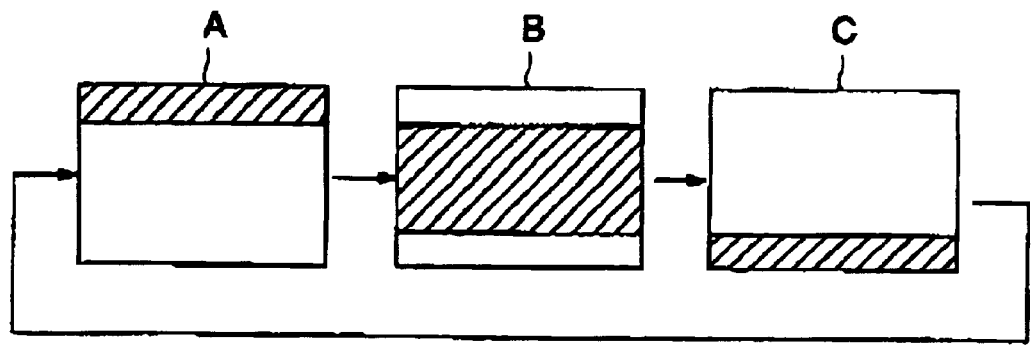
FIG. 13 is an illustration that shows an example of a display pattern for a warning blur that is displayed on the in-finder LCD.

FIG. 13 is an illustration which shows an example of a blur warning pattern that is displayed on the in-finder LCD 6a.

First, only the top part is shaded, as shown in the frame A. Then, only the center part that corresponds to the photographic range for panoramic photographs is shaded, as shown in frame B. Finally, only the bottom part, which is shaded for the panoramic photographs, is shaded as shown in the frame C. This sequence is repeated. This allows the user looking into the finder to recognize blur.

This display pattern can give the impression that the finder screen is shaken. After the user re-holds the camera 10 and blur is no longer present, the frame D or E in FIG. 14 is shown according to the regular or panoramic mode and the subject is monitored by the finder.

Figure 15:
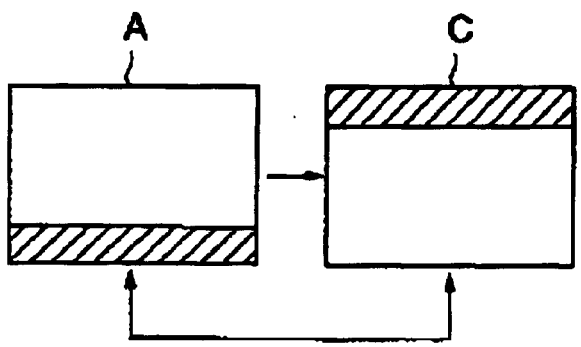
FIG. 15 is an illustration that shows an example of display patterns for a warning blur displayed on the in-finder LCD.

FIG. 15 is an illustration which shows another example of blur warning display pattern that is displayed on the LCD 6a. This display pattern uses the shaded areas of the panoramic photograph mode, as described relating to FIG. 13. Here, the blur warning display pattern in FIG. 15 involves the top and bottom shaded areas that are alternately displayed such as shown in the frames A and C.

Unlikely the pattern in FIG. 13, the blur warning display pattern in FIG. 15 always leaves the center part of the screen showing the subject and nothing obstructs the viewing of the subject including his/her face during the blur warning. The top and bottom parts are alternately shaded during the blur warning so that the user never mistakenly assumes that this is the normal display shown in FIG. 14.

However, a constant warning may be annoying and some highly skilled users may be well aware of and effectively use blur in their photographs for effect. Thus, it is preferable that the function to give a blur warning so as to urge the user to check his/her hold is one of the photographic modes, and the user can select this mode when needed. In this embodiment, the blur warning provided by the LCD 6 on the top of the camera body is in effect only when the blur mode is selected by means of the mode change switch 13c.

FIG. 8A through FIG. 8D are illustrations to explain the operation to select the blur mode. As shown FIG. 8A, the mode change switch 13c is provided next to the LCD 6 on the top of the camera body. The LCD 6 serves to perform functions such as film counting 6d in the normal operation. However, as shown FIG. 8B, the LCD 6 allows the blur mode setting when the mode change switch 13c is operated by the user.

Figure 8A:
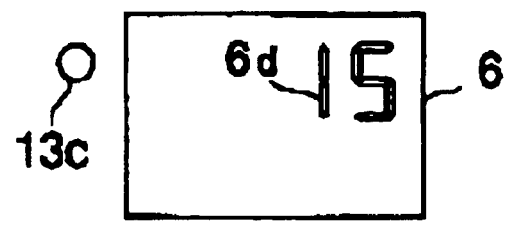
FIG. 8A through FIG. 8D are illustrations used to explain the functions of the mode change switch and liquid crystal display element on the top surface of the camera body relating to the embodiments of the present invention in detail.
Figure 8B:
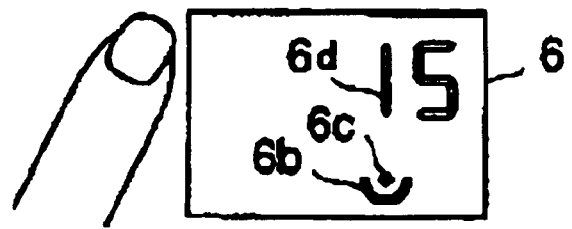
Figure 8C:
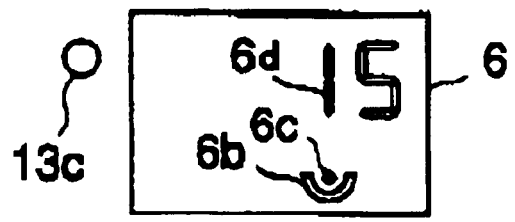

When the blur mode is selected, the LCD 6 displays segments 6b and 6c with the segment 6b flashing as shown in FIGS. 8B and 8C. This informs the user that the blur mode is selected for checking the camera hold.

Figure 8D:
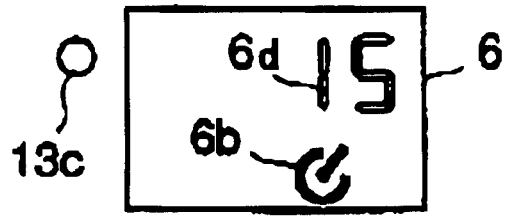

As shown in FIG. 8D, this mode display partly overlaps the self-timer mode display. Thus, there is no need of extra layout elements in the LCD 6.

Figure 9:
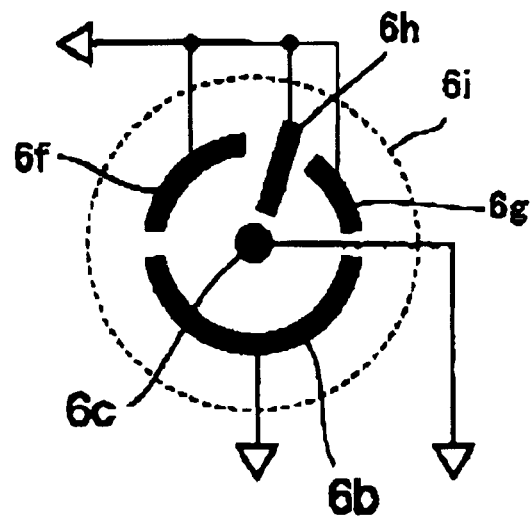
FIG. 9 is an illustration which shows an example of display segment disposition displayed on the liquid crystal display element on the top part of the body.

FIG. 9 is an illustration to show self timer mode display elements, segments 6b, 6c, 6f, 6g, and 6h. The segments 6b and 6c are separately provided on a board 6i and independently controlled for display.

Figure 10:
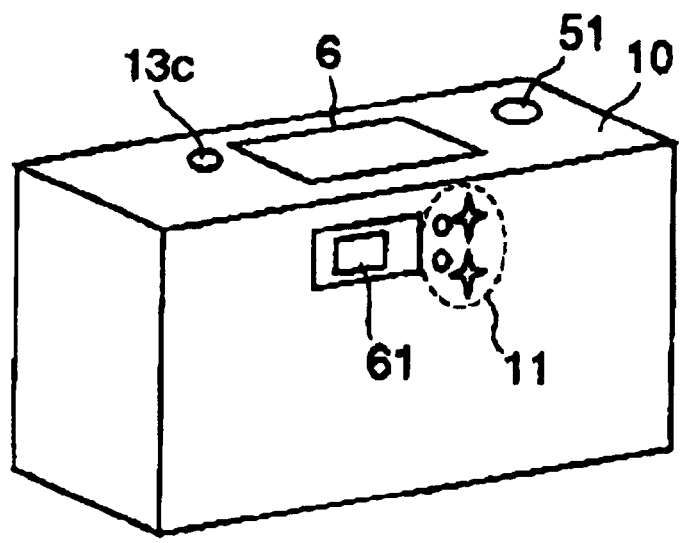
FIG. 10 is the appearance of the camera viewed from the back relating to the embodiments of the present invention.

A blur warning display by the LED provided near the ocular part of the camera body is hereafter described with reference to FIG. 10. FIG. 10 shows the appearance of the camera 10 viewed from the back. A release button 51 is provided on the top surface of the camera body in addition to the LCD 6 and mode setting switch 13c described above. The release button 51 is used to operate the first release switch 13a and the second release switch 13b. A finder ocular part 61 and the warning display part 11 such as an LED are provided on the back of the camera body. The warning display part 11 is flashed to give a blur warning to the user when the camera 10 detects blur.

The user holds the camera 10 after he/she selects the blur mode. If unsteady holding is found, the in-finder LCD 6a flashes as described above and the warning display part 11, such as an LED, near the finder ocular part 61 of the camera 10 flashes as shown in FIG. 10. The warning part 11 on the back of the camera body allows the user to recognize the blur without putting his/her eye close to the finder ocular part 61. In this way, the warning display part 11 on the back of the camera body is useful for digital cameras provided with a liquid crystal image monitor on the back of the camera body.

Figure 11:
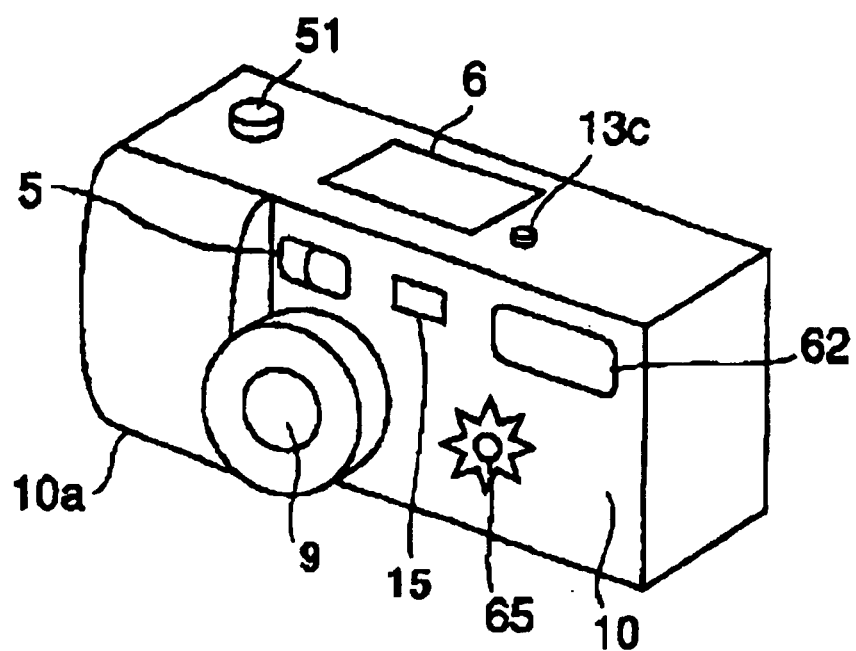
FIG. 11 is the appearance of the camera viewed from the front relating to the embodiments of the present invention.

A blur warning display using the self-timer display LED 65 provided on the front surface of the camera body is described next. FIG. 11 is the appearance of the camera 10 viewed from the front, A barrier 10a is opened. A strobe window 62 and the self-timer display LED 65 are provided on the front surface of the camera body. In this embodiment, the self-timer display LED 65 flashes to give a warning when blur is detected, as shown in FIG. 11. The warning display provided on the front surface of the camera body allows the camera owner to check the camera holding of a photographer to which the camera owner has asked to take a photograph of him/her.

Blur warnings are not confined to the examples above and various warning displays can be applicable depending on photographing conditions.

Figure 7A:
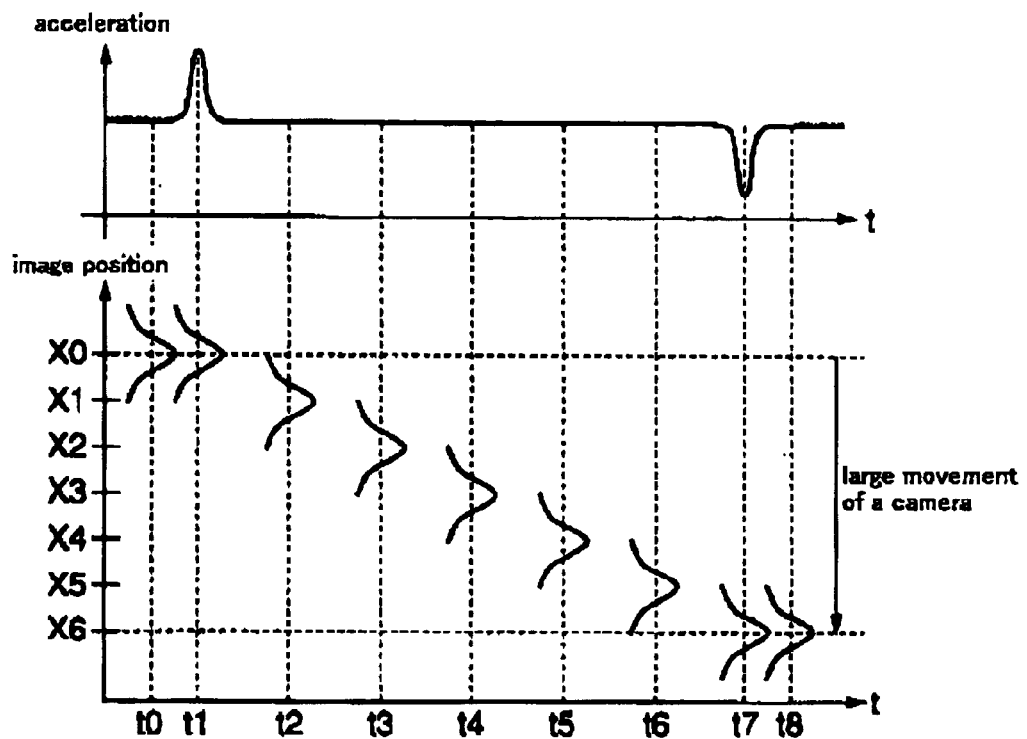
FIG. 7A and FIG. 7B are graphic representations showing the difference between the AF sensor output (image signals) characteristic of the present invention and the acceleration sensor output.
Figure 7B:
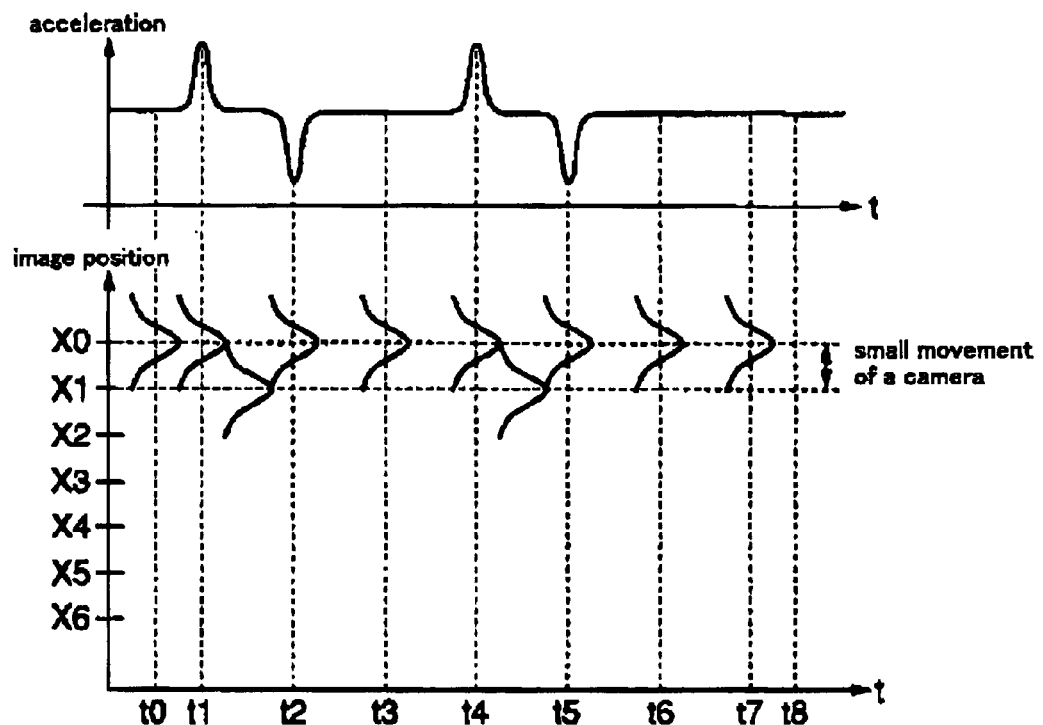

The method for detecting blur in this embodiment is described next. FIGS. 7A and 7B are graphic representations showing the differences in output between the AF sensor 5 (image signals) and the acceleration sensor 3. Here, it is assumed that the user causes blur movements having both X and Y components as shown in FIG. 6B.

FIG. 7A is a graphic representation to show the difference in output between the acceleration sensor 3 and the AF sensor 5 for the same blur, The top part of the FIG. 7A shows the output of the acceleration sensor 3 when blur is detected with acceleration magnitude as ordinate and time as abscissa. The bottom part shows the output of the AF sensor 5 when the same blur is detected with image position on the sensor array 5c as ordinate and time as abscissa. In this case, the camera 10, which is still at the time zero, is subject to blur in one direction (the direction that includes X and Y components) at the time period of t1 to t7, and back to still at the time t8.

As shown in FIG. 7A, the acceleration sensor 3 produces a signal at the moment when the camera 10, which was still at the time t=t0, started moving at the time t=t1. Then, the acceleration sensor 3 does not produce signals because of no acceleration while the camera 10 moves at a constant speed from t=t2 to t=t6 regardless of the fact the camera 10 is moving.

When the camera stops at t=t7, the acceleration sensor 3 produces a signal that indicates the constant speed movement has halted. The camera 10 is still at t=t8 and after.

The AF sensor 5 continuously produces image signals that change during the constant speed movement from the time t1 to t7 so as to supplement the acceleration sensor 3. Thus, the output from the AF sensor 5 can be evaluated to determine whether the camera 10 is in motion even though the acceleration sensor 3 produces no output.

FIG. 7B shows the case in which the acceleration sensor 3 produces outputs while the output of the AF sensor 5 produces image signals without remarkable changes. This is because short, quick blur is frequently present. This can be observed when the user tries to hold the camera 10 with shaky hands. The output in FIG. 7B is generally observed when the user holds the camera 10 with shaky hands. Unlike the case of FIG. 7A, FIG. 7B leads to little changes in images. Successful photographs will be often obtained for a certain range of focal lengths of the camera lens.

The camera 10 may be subject to slight movement even though the acceleration sensor 3 produces remarkable output signals. On the other hand, the camera may be subject to major positional shifts even though the acceleration sensor 3 rarely produces an output. These matters should be considered in evaluating the output of the acceleration sensor 3.

There are several points to notice in evaluating blur using the AF sensor 5. For example, the AF sensor 5 of a camera 10 is unable to detect changes in images with less contrast or in dark images. Furthermore, when the camera 10 is largely moved so that the image that the AF sensor 5 monitors comes out of the monitor range and another image comes into it, correct blur evaluation is impossible.

Both the acceleration sensor 3 and the AF sensor 5 allow detection in one direction as in this embodiment and are unable to detect movements or image changes in other directions.

Thus, it is preferred that two detection systems by the acceleration sensor 3 and AF sensor 5 are selectively used to the evaluate blur.

Figure 12:
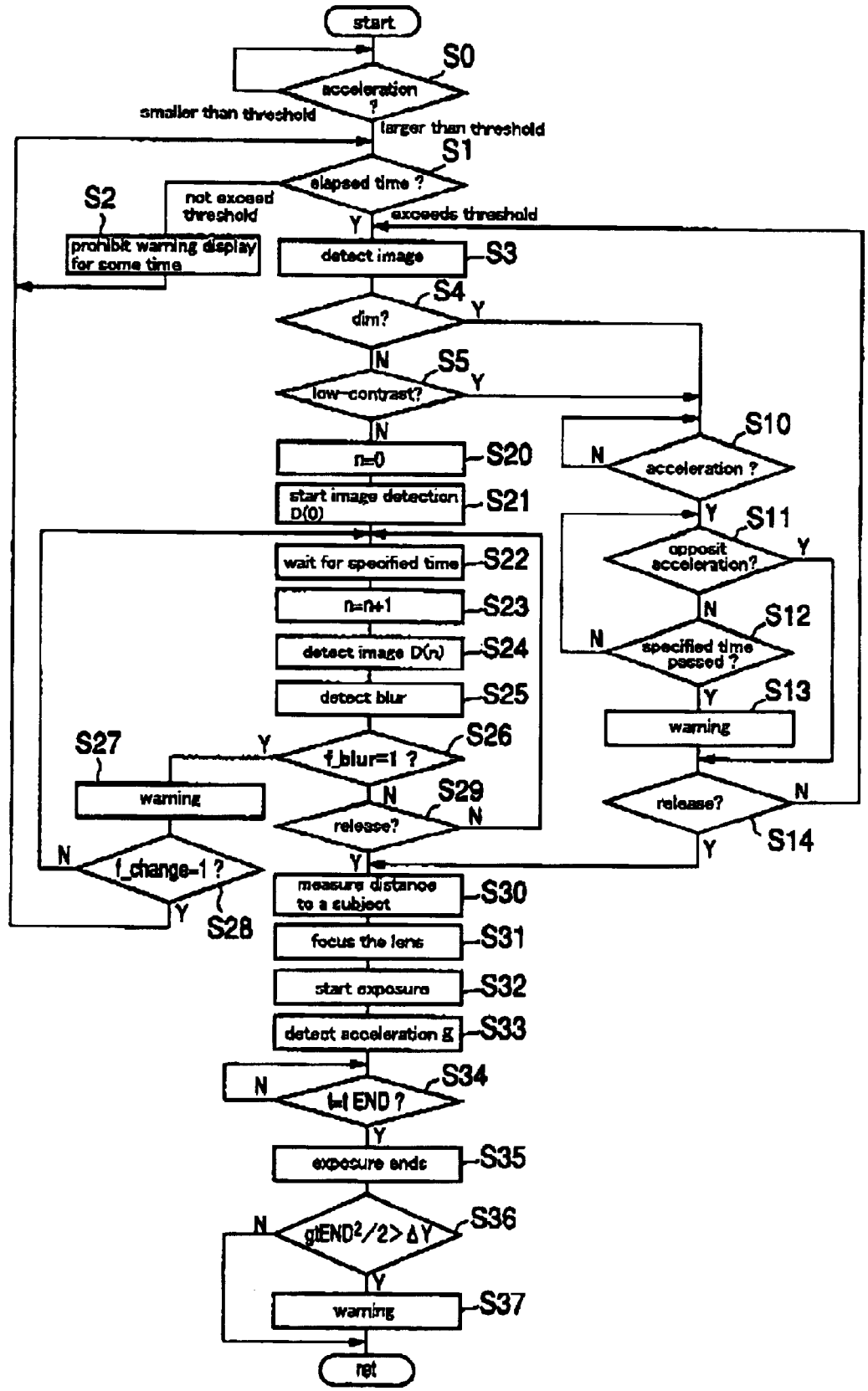
FIG. 12 is a flowchart used to explain the sequence of a built-in program executed by the CPU in the camera relating to the embodiments of the present invention.

FIG. 12 is a flowchart explaining the control sequence including blur display control according to a built-in program that is executed by the CPU 1 in the camera 10.

In the flowchart of FIG. 12, first, the CPU 1 evaluates the output of the acceleration sensor 3 (Stop S0). If the acceleration sensor 3 produces slight output, it returns to Step S0. If acceleration beyond a certain threshold magnitude is detected, the CPU 1 proceeds to the next step S1.

Then, the CPU 1 determines whether a specified time period has elapsed since Step S0 (Step S1). If the specified time period has not elapsed, the blur warning display is inhibited (Step S2). This is for starting actual blur detection after the specified time period elapses since the first, detected remarkable acceleration caused by blur.

For example, the user first performs framing after he/she opens the barrier 10a that protects camera lens 9 on the front surface of the camera body. At this point, the user has not held the camera 10 properly so that the camera 10 may be subject to large movements. Thus, evaluation by the AF sensor 5 is ineffective. The AF sensor 5 monitors only a small area within the screen, therefore, it cannot give proper quantitative evaluation for large movements of the camera 10.

Thus, this embodiment first evaluates the output of the acceleration sensor 3 and inhibits holding warning displays for a specified time period even if some shocks occur when the barrier 10a is opened or the user holds the camera 10.

Then, an image is detected by the AF sensor 5 (Step S3). According to the image detection result, the CPU 1 determines whether the image is suitable for blur detection. First, it is determined whether the image has low brightness (Step S4). If the image has low brightness and, therefore, it is not suitable for acceleration detection by the AF sensor 5, the acceleration detection sequence by the acceleration sensor 3 starting with Step S10 is performed.

If the image does not have low brightness, the CPU 1 determines whether the image has low contrast (Step S5). If the image has low contrast and, therefore, it is not suitable for acceleration detection by the AF sensor 5, the acceleration detection sequence by the acceleration sensor 3 starting with Step S10 is performed.

Now, the acceleration detection by the acceleration sensor 3 starting with Step S10 is described. First the CPU 1 waits until acceleration is detected (Step S10). This is to detect acceleration after a specified time period since the CPU 1 detects acceleration at Step S0. Acceleration to be detected here presumably reflects blur caused by the user holding the camera 10 after preparation for photography is made. After the acceleration sensor 3 outputs a signal, the CPU 1 waits for acceleration in the opposite direction for a specified time period (Steps S11 and S12). When the opposite direction acceleration is not detected, the CPU 1 issues a warning (Step S13). When the opposite direction acceleration is detected in a specified time period, the CPU does not issue a warning.

This is because, as shown in FIG. 7A the camera can be assumed to move in a constant speed when the opposite direction acceleration is not detected in a specified time period after acceleration is detected. In this case, blur is highly likely present and the CPU 1 issues a warning to the user to inform him/her of it. Alternatively, in this state, the user may have intention of taking a series of photographs. Then, for example, the warning display part (for example, LED) 11 near the finder ocular part 61 can flash as shown in FIG. 10 because the flashing of the in-finder LCD 6a as shown in FIG. 13 can be hardly seen and can be annoying. If acceleration in the opposite direction is detected in a specified time period after acceleration is detected, this is assumed to be ordinary holding of the camera 10, as shown in FIG. 7B. In this case, blur is unlikely present. Therefore, the CPU 1 does not issue a warning. After the acceleration detection by the acceleration sensor 3 is completed, the CPU 1 determines whether the release button 51 is pushed (Step S14). If the release button 51 is pushed, it proceeds to Step S30 where the exposure sequence starts. If it is not pushed, it returns to Step S3.

If the image is not found to have low brightness at Step S4 or to have low contrast at Step S5, the CPU 1 performs the blur detection sequence by the AF sensor 5 starting with Step S20. The sequence includes the image detection that is repeated at a specified time intervals and the comparison of consecutive image detection results at Step S25 to detect blur.

First, the CPU 1 sets a counter n to 0 (Step S20) and detects an image (Step S21). Then, the CPU 1 waits for a specified time period (Step S22), adds 1 to the counter n (Step S23), and detects an image (Step S24). Subsequently, the CPU 1 compares the image detected in Step S24 with the image detected immediately before it to detect blur (Step S25).

The blur detection is described later in detail, with reference to the flowchart of FIG. 18. If the CPU 1 detects blur at Step S25, it changes a blur flag (f_blur) to 1 from 0. The blur flag (f_blur) is a flag that is changed to 1 from 0 when blur is detected. If the blur magnitude is larger than a specified magnitude, it is assumed that the user tries to change compositional arrangement and, therefore, the CPU changes a compositional arrangement change flag (f_change) to 1 from 0. The compositional arrangement change flag (f_change) is a flag that is changed to 1 from 0 when compositional arrangement change is detected.

Then, the CPU 1 determines whether blur is detected by means of the blur flag (f_blur) (Step S26). When blur is detected, a blur warning is issued (Step S27). The CPU determines whether the user tries to change compositional arrangement by means of the compositional arrangement change flag (f_change) (Step S28). When the user does not try to change compositional arrangement, the CPU 1 goes back to Step S22 and repeats the blur detection sequence using images once again. When the user tries to change compositional arrangement, the CPU 1 returns to Step S1 and performs the blur detection by the acceleration sensor 3 or AF sensor 5 depending on the properties (brightness, contrast,) of a new image. In this way, when blur is detected at Step S26, proceeding to the release evaluation and exposure sequence is not allowed.

When the CPU 1 assures that blur is not detected by means of the blur flag (f_blur) at Step S26, it determines whether release has occurred (Step S29). When release has not occurred, the CPU 1 returns to Step S22 and repeats the blur detection sequence using image once again. When the release is done, it proceeds to Step S30.

The exposure sequence begins at Step S30. First, the CPU 1 measures the distance to a subject using the AF sensor 5 (Step S30). According to the distance information, the motor 18 is driven to focus the camera lens 9 (Step S31). Then, the CPU 1 determines the exposure time based on the subject's brightness information obtained from the image detection result at Step S3 and starts exposure (Step S32). At the same time, a counter to measure the exposure time is activated.

Shaking of the camera 10 causes blur during exposure. Therefore, the CPU 1 detects acceleration using the acceleration sensor 3 and calculates the acceleration g due to the shock caused by the release button 51 being pushed (Step S33). The acceleration g can also be obtained by the AF sensor 5. Larger acceleration g will result in blurred photographs even with a shorter exposure time. Larger exposure time will result in blurred photographs even with smaller acceleration g.

The CPU 1 counts the exposure time and compares the time t to the exposure end time tEND (Step S34) and, when the exposure ends (Step S35), calculates the camera speed using the obtained acceleration g and exposure time tEND. The camera 10 moves at the calculated speed and for the time period of TEND. Thus, the movement of the camera 10 is calculated. It is determined whether the movement $(gtEND^2/2)$ exceeds the tolerance $\Delta Y$ of the camera lens 9 (Step S36). If the movement exceeds the tolerance, a blur warning is issued (Step S87) and it returns. If the movement has not exceeded the tolerance, it returns without issuing a warning.

These blur warnings allows the user to recognize he/she is unintentionally causing blur and take precautions to avoid blur such as holding the camera 10 with both hands or placing the camera 10 on something stationary such as a tripod. In addition to or in place of blur warnings, blur correction processes (vibration absorption processes) can be performed.

Figure 17:
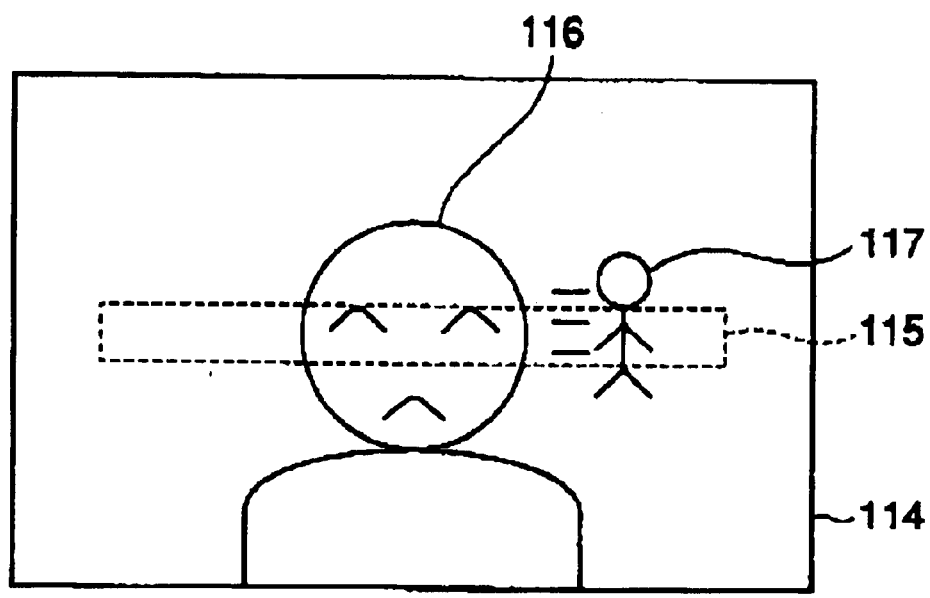
FIG. 17 is an illustration used to show a photographic scene in which the main subject is followed by a moving subject.

The blur detection process using the AF sensor 5 is described hereafter. FIG. 17 is an example of a photograph frame 114. The view field 115 of line sensor arrays 5c is situated near the center of the photograph frame 114. The photograph frame includes a person or a main subject 116 and a moving subject 117 behind it.

In the photographic scene in which the main subject 116 has the moving subject 117 behind it as shown in FIG. 17, the blur detection by the AF sensor 5 detects larger image shift magnitudes under the influence of the moving subject 117. Therefore, blur is mistakenly detected even though the camera 10 is firmly held.

In this embodiment, the blur detection region is divided into plural areas, with image shift magnitude being detected for each area. These areas are used to determine whether the entire photograph frame is moving or only some subjects in a portion of the screen. Then, the misjudgement described above can be avoided.

Figure 16:
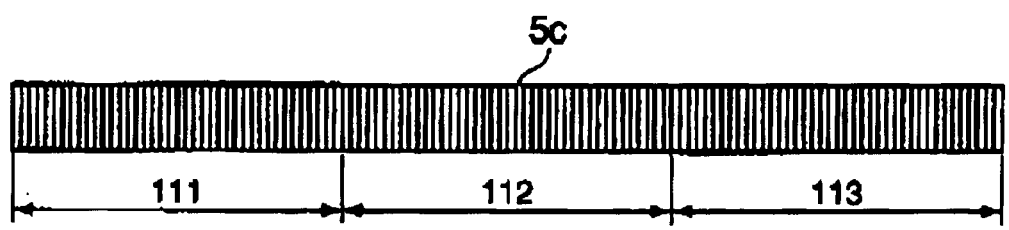
FIG. 16 is an illustration that shows an example of the division of a blur detection region of an AF sensor in the embodiments of the present invention.

FIG. 16 is an illustration showing the structure of the blur detection region of the sensor array 5c of this embodiment. As shown in the figure, the sensor array 5c has a left detection area 111, a center detection area 112, and a right detection area 113. Each detection area consists of an array of plural image detection elements.

Each detection area can be a separate detection array or a division of a single long detection array divided through a software processing. The sensor array 5c of this embodiment has three areas. However, the number of areas is not confined to three. The sensor array 5c can be flexibly divided into any number of areas depending on the subject (for example based on the distance to the subject). For example, the detection area for main subjects is used when the distance information indicates short distances and the detection area for background is used when the distance information indicates long distances. In this way, blur of the main subject 116 is precisely detected.

Figure 18:
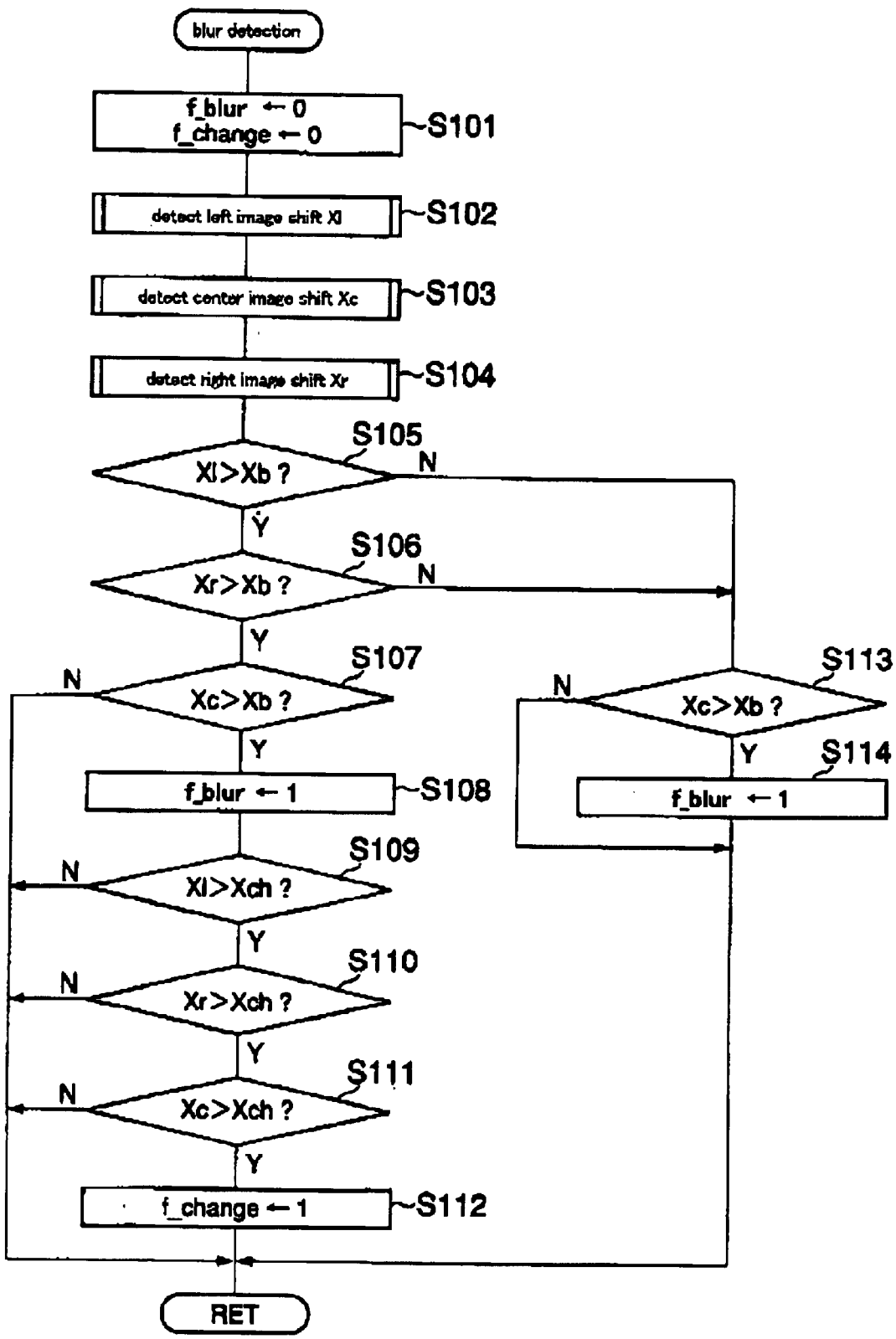
FIG. 18 is a flowchart used to explain the blur detection process in Embodiment 1 of the present invention in detail.

FIG. 18 is a flowchart to explain the blur detection in Step S25 of FIG. 12 in detail.

First, the CPU 1 clears the blur flag (f_blur) and compositional arrangement flag (f_change) (Step S101).

Then, the CPU 1 detects the image shift magnitude Xl between the previously detected image data D(n−1) and the currently detected image data D(n) in the left area 111 of the sensor array 5c using a known correlation operation (Step S102).

Then, the CPU 1 detects the image shift magnitude Xc between the previously detected image data D(n−1) and the currently detected image data D(n) in the center area 112 of the sensor array 5c using a known correlation operation (Step S103).

Then, the CPU 1 detects the image shift magnitude Xr between the previously detected image data D(n−1) and the currently detected image data D(n) in the right area 113 of the sensor array 5c using a known correlation operation (Step S104).

Then, the CPU 1 compares the image shift magnitude Xl in the left area 111 of the sensor array 5c with a blur reference value Xb (Step S105). If the image shift magnitude Xl is larger than the blur reference value Xb, it proceeds to Step S106. If the image shift magnitude Xl is smaller than or equal to the blur reference value Xb, it proceeds to Step S113.

If the image shift magnitude Xl is larger at Step S105, the CPU 1 compares the image shift magnitude Xr in the right area 113 of the sensor array 5c with the blur reference value Xb (Step S106). If the image shift magnitude Xr is larger than the blur reference value Xb, it proceeds to Step S107. If the image shift magnitude Xr is smaller than or equal to the blur reference value Xb, it proceeds to Step S113.

If the image shift magnitude Xr is larger at Step S106, the CPU 1 compares the image shift magnitude Xc in the center area 112 of the sensor array 5c with the blur reference value Xb (Step S107). If the image shift magnitude Xc is larger than the blur reference value Xb, the image shift magnitude is large throughout the photograph frame; therefore, the CPU 1 assumes that blur is present and it proceeds to Step S108. If the image shift magnitude Xc is smaller or equal to the blur reference value Xb, the image shift magnitudes are large in the periphery of the photograph frame where miscellaneous subjects are highly likely present and the image shift magnitude is small in the center part where a main subject is highly likely present. Thus, the CPU 1 assumes that blur is absent, miscellaneous subjects in the periphery of the photograph frame are moving, ends the blur detection, and returns.

If the image shift magnitude Xc is larger at Step S107, the CPU 1 sets the blur flag (f_blur) (Step S108). Then, the CPU 1 compares the image shift magnitude Xl in the left detection area 111 of the sensor array 5c with a compositional arrangement change reference value Xch (Step S109). If the image shift magnitude Xl is larger than the compositional arrangement change reference value Xch, it proceeds to Step S110. If the image shift magnitude Xl is smaller than or equal to the compositional change reference value Xch, it ends the blur detection and returns.

If the image shift magnitude Xl is larger at Step S109, the CPU 1 compares the image shift magnitude Xr in the right area 113 of the sensor array 5c with the compositional arrangement change reference value Xch (Step S110). If the image shift magnitude Xr is larger than the compositional arrangment change reference value Xch, it proceeds to Step S111. If the image shift magnitude Xr is smaller than or equal to the compositional arrangement reference value Xch, it ends the blur detection and returns.

If the image shift magnitude Xr is larger at Step S111, the CPU 1 compares the image shift magnitude Xc in the center area 112 of the sensor array 6c with the compositional arrangement change reference value Xch (Step S111). If the image shift magnitude Xc is larger than the compositional arrangement change reference value Xch, the image shift magnitude throughout the photograph frame is larger than that of normal blur. The CPU 1 assumes that photographic compositional arrangement is being performed and proceeds to Step S112.

If the image shift magnitude Xc is smaller than or equal to the compositional arrangement change reference value Xch, the image shift magnitude in the periphery of the photograph frame where miscellaneous subjects are highly likely present is larger than that of normal blur and the image shift magnitude in the center of the photograph frame where main subjects are highly likely present is as large as that of normal blur, the CPU 1 assumes that miscellaneous subjects in the periphery of the photograph frame are moving and blur is present as well, ends the blur detection, and returns.

If the image shift magnitude Xc is larger than the compositional arrangement change reference value Xch at Step S111, the CPU 1 sets the compositional arrangement change flag (f_change) in Step 112 and returns.

Proceeding to Step S113 from Step S106 or S106, the CPU 1 compares the image shift magnitude Xc in the center area 112 of the sensor array 5c with the blur reference value Xb (Step S113). If the image shift magnitude Xc is larger than the blur reference value Xb, the CPU 1 assumes that blur is absent, but the main subject in the center of the photograph frame is moving. If a photograph is taken in this circumstance, the obtained photograph will include a blurred subject. Therefore, the CPU 1 proceeds to Step S114. If the image shift magnitude Xc is smaller than or equal to the blur reference value Xb, the CPU 1 assumes that blur is absent, ends the blur detection, and returns.

If the image shift magnitude Xc is larger at Step S113, the CPU 1 sets the blur flag (f_blur) (Step S114) and returns.

As described above, this embodiment effectively uses the AF sensor 5 for the blur detection process. Using AF sensor 5 not only for ranging measure, but also for the blur detection process leads to improved camera 10 functions and added value. In place of mono-dimensional line sensors in this embodiment, two dimensional sensors can be used for detecting blur components in two, X and Y, directions in alternate embodiments of the invention. Image pick-up elements other than the AF sensor 6, for example, digital camera CCD or CMOS image sensor, can be used for the blur detection by monitoring their outputs in alternate embodiments of the invention.

This embodiment uses a combination of the AF 6 and acceleration sensors 3 that are selectively used depending on image properties (brightness, contrast). Thus, it is capable of dealing with dark or low contrast scenes.

The AF sensor 5 has a blur detection region divided into plural areas and the image shift magnitude of each area is evaluated for blur or moving subjects. This prevents misjudged blur based on miscellaneous subjects moving in the photograph frame 114. It can also prevent blurred photographs caused by movement of the subject itself.

The acceleration sensor 3 detects acceleration in the opposite direction in a specified time period after acceleration is detected so as to determine low or high blur possibilities. This reduces false warnings.

Consideration is given to software for distinguishing acceleration caused by the opening/closing of the barrier 10$a$ and framing from acceleration caused by blur. This also reduces false warnings.

These characteristics enable blur evaluation of obtained photographs in correspondence with the focal length of the camera lens 9 and shutter speed during photography.

The calculated movement can be used to adjust the position of the camera lens 9, which has applications in cameras with vibration absorption functions.

(Embodiment 2)

Embodiment 2 is a modified embodiment of Embodiment 1 described above. Therefore, the differences from Embodiment 1 are primarily described.

Embodiment 2 determines whether blur is present and whether photographic compositional arrangement is being changed using only the image shift magnitude in the center area 112 of the sensor array 5$c$ when the camera 10 is in the spot photograph mode. If it is not in the spot photography mode, the image shift magnitudes in the left, center, and right areas of the sensor array 6$c$ are used for evaluation as is in Embodiment 1.

In other words, the photographer's interest focuses on the main subject 116 in the center of the photograph frame 114 during the spot photograph mode. Therefore, only the image shift magnitude in the center area 112 is used for precise blur detection.

Switching of the blur detection depending on the photographic modes is not confined to the spot mode. Various modifications arc undoubtedly available: for example, the image shift magnitude in the entire AF sensor 5 can be used for the scenery mode without using divided blur detection areas, the image shift magnitude in the center area 112 can be used for the portrait mode as is for the spot mode.

Embodiment 2 as described above allows optimized blur detection depending on the camera's photographic modes.

Figure 19:
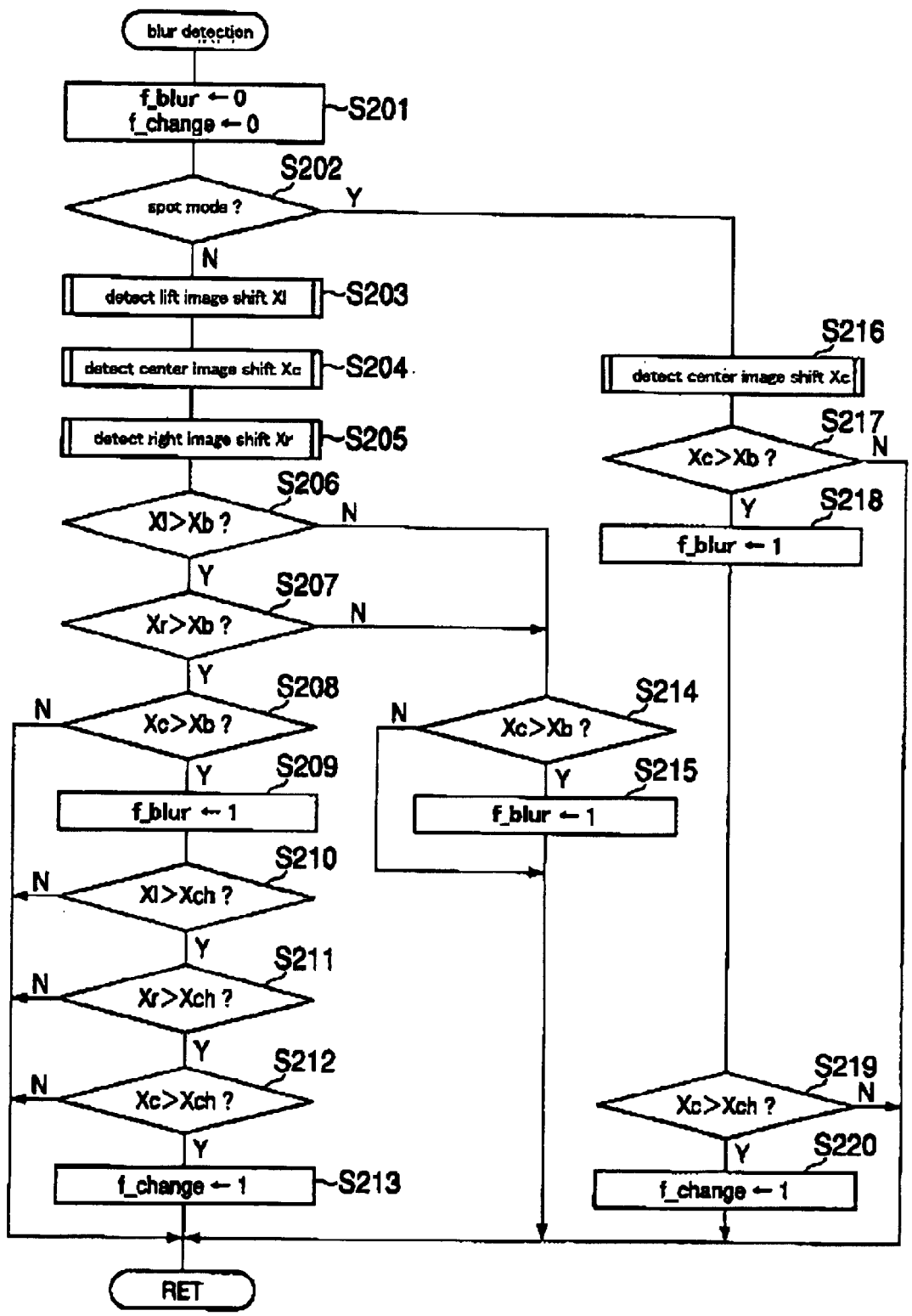
FIG. 19 is a flowchart used to explain the blur detection process in Embodiment 2 of the present invention in detail.

FIG. 19 is a flowchart explaining the blur detection process of Embodiment 2 in detail.

First, the CPU 1 clears the blur flag (f_blur) and compositional arrangement change flag (f_change) (Step S201). Then, the CPU 1 determines whether the camera 10 is in the spot photographic mode (Step S202). If it is not in the spot mode, the CPU 1 proceeds to Step S203 and performs the blur detection sequence using all the left (111), center (112), right (113) areas of the sensor array 5$c$ as is in Embodiment 1. On the other hand, if it is in the spot mode, it proceeds to Step S216 and performs the blur detection sequence using only the center area of the sensor array 5$c$.

If it is not in the spot mode, the CPU 1 detects the image shift magnitude Xl between the previously detected image data D(n−1) and the currently detected image data D(n) in the left area 111 of the sensor array 5$c$ (line sensor 5$c$) using a known correlation operation (Step S203).

Then, the CPU 1 detects the image shift magnitude Xc between the previously detected image data D(n−1) and the currently detected image data D(n) in the center area 112 of the sensor array 5$c$ using a known correlation operation (Step S204).

Then, at Step S205, the CPU 1 detects the image shift magnitude Xr between the previously detected image data D(n−1) and the currently detected image data D(n) in the right area 113 of the sensor array 6$c$ using a known correlation operation (Step S205).

Then, the CPU 1 compares the image shift magnitude Xl in the left area 111 of the sensor array 5$c$ with the blur reference value Xb (Step S206). If the image shift magnitude Xl is larger than the blur reference value Xb, it proceeds to Step S207. If the image shift magnitude Xl is smaller than or equal to the blur reference value Xb, it proceeds to Step S214.

If the image shift magnitude Xl is larger at Step S206, the CPU 1 compares the image shift magnitude Xr in the right area 113 of the sensor array 5$c$ with the blur reference value Xb (Step S207). If the image shift magnitude Xr is larger than the blur reference value Xb, it proceeds to Step S208. If the image shift magnitude Xr is smaller than or equal to the blur reference value Xb, it proceeds to Step S214.

If the image shift magnitude Xr is larger at Step S207, the CPU 1 compares the image shift magnitude Xc in the center area 112 of the sensor array 5$c$ with the blur reference value Xb (Step S208). If the image shift magnitude Xc is larger than the blur reference value Xb, the image shift magnitude is Large throughout the photograph frame 114; therefore, the CPU 1 assumes that blur is present and proceeds to Step S209.

If the image shift magnitude Xc is smaller than or equal to the blur reference value Xb, the image shift magnitude is large in the periphery of the photograph frame where miscellaneous subjects are highly likely present and the image shift magnitude is small in the center part where a main subject 116 is highly likely present. Thus, the CPU 1 assumes that blur is absent and miscellaneous subjects in the periphery of the photograph frame are moving, ends the blur detection, and returns.

If the image shift magnitude Xc is larger at Step S208, the CPU 1 sets the blur flag (f_blur) (Step S209). Then, the CPU 1 compares the image shift magnitude Xl in the left area 111 of the sensor array 5$c$ with the compositional arrangement change reference value Xch (Step S210). If the image shift magnitude Xl is larger than the compositional arrangement change reference value Xch, it proceeds to Step S211. If the image shift magnitude Xl is smaller than or equal to the compositional arrangement change reference value Xch, it ends the blur detection and returns.

If the image shift magnitude Xl is larger at Step S210, the CPU 1 compares the image shift magnitude Xr in the right area 113 of the sensor array 5c with the compositional arrangement change reference value Xch (Step S211). If the image shift magnitude Xr is larger than the compositional change reference value Xch, it proceeds to Step S212. If the image shift magnitude Xr is smaller than or equal to the compositional change reference value Xch, it ends the blur detection and returns.

If the image shift magnitude Xr is larger at Step S211, the CPU 1 compares the image shift magnitude Xc in the center area 112 of the sensor array 5c with the compositional arrangement change reference value Xch (Step S212). If the image shift magnitude Xc is larger than the compositional change reference value Xch, the image shift magnitude throughout the photograph frame 114 is larger than that of normal blur. Thus, the CPU 1 assumes that photographic compositional arrangement is being changed and proceeds to Step S213.

If the image shift magnitude Xc is smaller than or equal to the compositional change reference value Xch, the image shift magnitudes in the periphery of the photograph frame 114 where miscellaneous subjects are highly likely present are larger than that of normal blur and the image shift magnitude in the center of the photograph frame 114 where main subjects are highly likely present is as large as that of normal blur. Thus, the CPU 1 assumes that miscellaneous subjects in the periphery of the photograph frame are moving and blur is present as well, ends the blur detection, and returns.

If the image shift magnitude Xc is larger at Step S212, the CPU 1 sets the compositional arrangement change flag (f_change) (Step S213) and returns.

If the image shift magnitude Xl is smaller than or equal to the blur reference value Xb at Step S206 or if the image shift magnitude Xr is smaller than or equal to the blur reference value Xb at Step S207, the CPU 1 compares the image shift magnitude Xc in the center area 112 of the sensor array 5c with the blur reference value Xb (Step S214).

If the image shift magnitude Xc is larger than the blur reference value Xb, the CPU 1 assumes that blur is absent, but the main subject 116 in the center of the photograph frame 114 is moving. If a photograph is taken in this circumstance, the obtained photograph will include a blurred subject. Therefore, the CPU 1 proceeds to Step S215. If the image shift magnitude Xc is smaller than or equal to the blur reference value Xb, the CPU 1 assumes blur is absent, ends the blur detection, and returns.

If the image shift magnitude Xc is larger at Step S214, the CPU 1 sets the blur flag (f_blur) (Step S215) and returns.

If the camera 10 is found to be in spot photographic mode at Step S202, the CPU 1 detects the image shift magnitude Xc between the previously detected image data D(n−1) and the currently detected image data D(n) in the center area 112 of the sensor array 5c (Step S216).

Then, the CPU 1 compares the image shift magnitude Xc in the center area 112 of the sensor array 5c with the blur reference value Xb (Step S217). If the image shift magnitude Xc is larger than the blur reference value Xb, the CPU 1 assumes that blur is present or the main subject 116 is moving and proceeds to Step S218. If the image shift magnitude Xc is smaller than or equal to the blur reference value Xb, the CPU 1 assumes that blur is absent and the main subject 116 is not moving, ends the blur detection, and returns.

If the image shift magnitude Xc is larger at Step S217, the CPU 1 sets the blur flag (f_blur) (Step S218). Then, the CPU 1 compares the image shift magnitude Xc in the center area 112 of the sensor array 5c with the compositional arrangement change reference value Xch (Step S219). If the image shift magnitude Xc is larger than the compositional arrangement change reference value Xch, the image shift magnitude is larger than that of normal blur. Thus, the CPU 1 assumes that photographic compositional arrangement is being changed and proceeds to Step S220.

If the image shift magnitude Xc is smaller than or equal to the compositional arrangement change reference value Xch, the CPU 1 assumes blur is present, ends the blur detection, and returns.

If the image shift magnitude Xc is larger at Step S219, the CPU 1 sets the compositional arrangement change flag (f_change) (Step S220) and returns.

As is described above, Embodiment 2 uses different detection areas on the AF sensor array 5c depending on the photographic modes, particularly optometric modes. This allows highly precise blur detection by the AF sensor 5 in accordance with photographic modes (particularly optometric modes among the photographic modes).

(Embodiment 3)

Embodiment 3 is a modified embodiment of Embodiment 1 described above. Therefore, differences from Embodiment 1 are primarily described. Embodiment 3 determines whether blur is present and whether photographic compositional arrangement is being changed using only the image shift magnitude in the center area 112 when the camera lens 9 is a zoom lens and it is in use with the larger focal lengths. However, when the camera lens 9 is in use with the smaller focal lengths, the image shift magnitudes in all the left, center, and right areas of the sensor array 5c are used for evaluation as is in Embodiment 1.

Figure 21A:
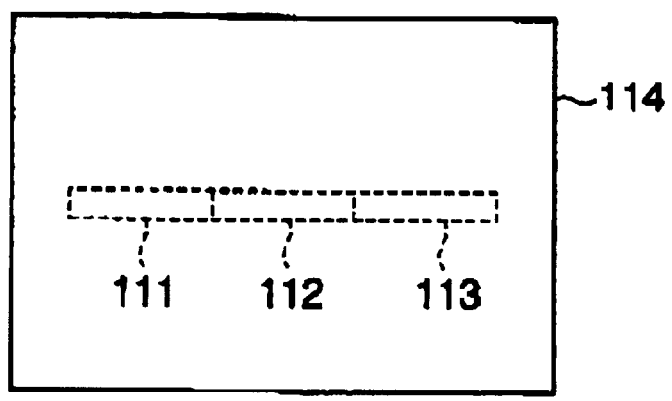
FIG. 21A and FIG. 21B are illustrations used to show the relationship between the AF sensor view field and the photograph frame relative to the focal length of the camera lens.
Figure 21B:
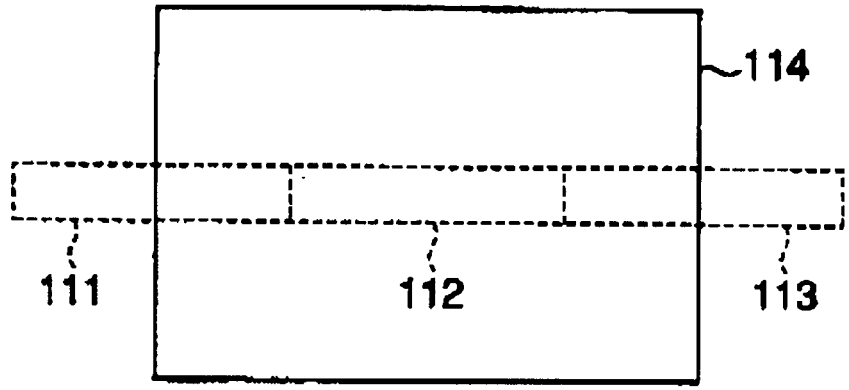

FIG. 21A shows the relationships between the photograph frame 114 and the AF sensor array view field when the focal length of the camera lens 9 is the smallest. As shown in FIG. 21A, the AF sensor view field is within the photograph frame 114. On the other hand, FIG. 21B shows the relationships between the photograph frame 114 and the AF sensor array view field when the focal length of the camera lens is the largest. As shown in FIG. 21B, the AF sensor view field extends beyond the photograph frame 114. In this case, the right and left detection areas 111 and 113 are under the influence of subjects outside the photograph frame 114. Using these areas disrupts precise blur detection.

Thus, Embodiment 3 uses only the image shift magnitude in the center area 112 for blur detection at the larger focal lengths, ensuring precise blur detection. The alterations of blur detection areas depending on the focal lengths are not confined to the stepwise manner described above, but can be continuous according to the focal lengths. For the largest focal length of the camera lens 9, the center area 112 can be further subdivided into plural sub-areas, to which the blur detection of Embodiment 1 is similarly applied.

Embodiment 3 described above enables proper blur detection depending on the focal lengths of the camera lens 9.

Figure 20:
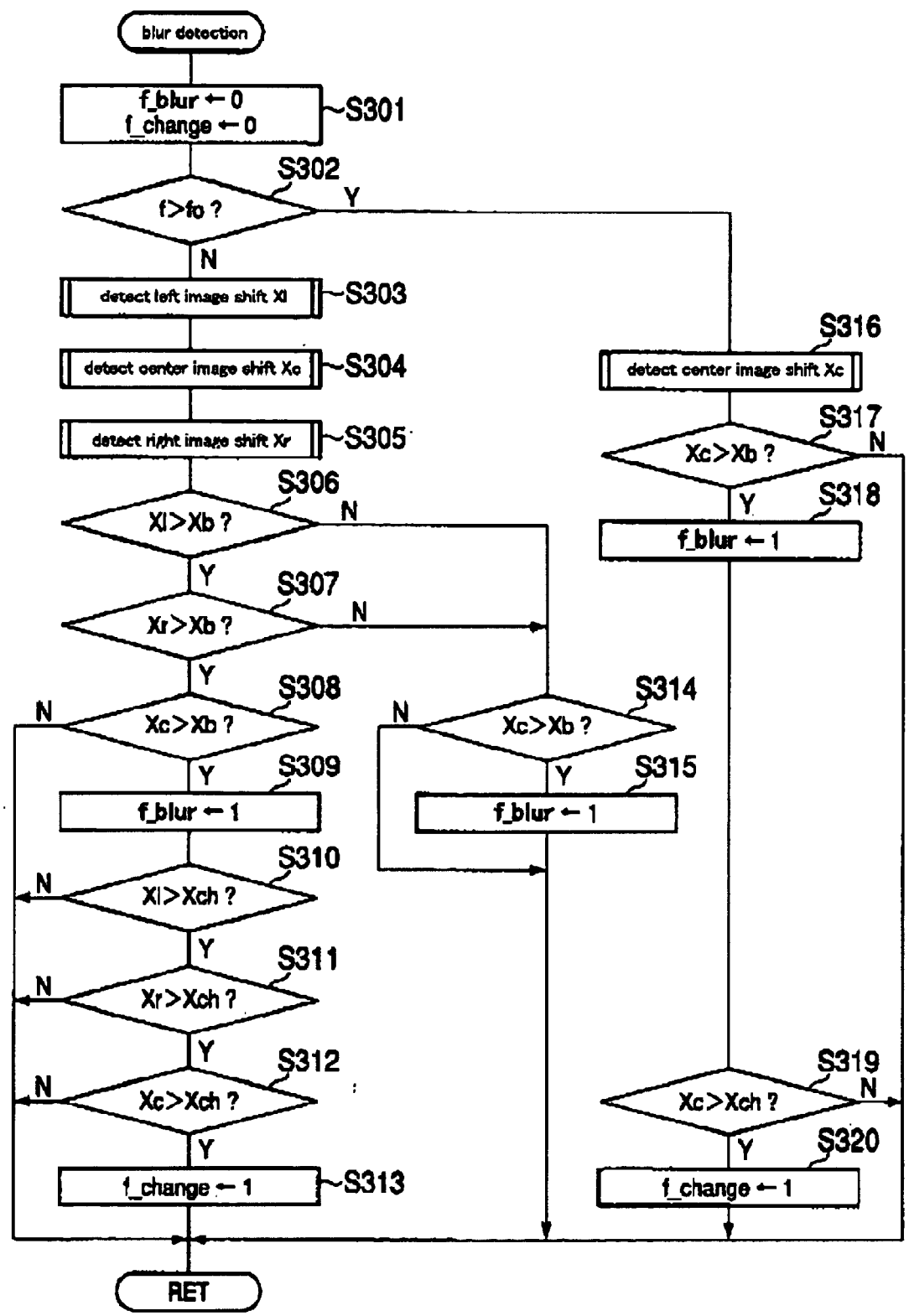
FIG. 20 is a flowchart used to explain the blur detection process in Embodiment 3 of the present invention in detail.

FIG. 20 is a flowchart to explain the blur detection process of Embodiment 3 in detail.

First, the CPU 1 clears the blur flag (f_blur) and compositional arrangement change flag (f_change) (Step S301).

Then, the CPU 1 determines whether the camera lens 9 has a focal length f that is larger than a certain value $f_0$ (Step S302). If the focal length f is smaller or equal to value $f_0$, the CPU 1 proceeds to Step S303 and performs the blur detection sequence using all the left (111), center (112), right (113) areas of the sensor array 5c. On the other hand, if the focal length f is larger than value $f_0$, the CPU 1 proceeds to Step S316 and performs the blur detection sequence using only the center area 112 of the sensor array 5c.

If the focal length f is smaller or equal to $f_0$ at Step S302, the CPU 1 detects the image shift magnitude Xl between the previously detected image data D(n−1) and the currently detected image data D(n) in the left area 111 among the divided blur detection areas using a known correlation operation (Step S303).

Then, the CPU 1 detects the image shift magnitude Xc between the previously detected image data D(n−1) and the currently detected image data D(n) in the center area 112 among the divided blur detection areas using a known correlation operation (Step S304).

Then, the CPU 1 detects the image shift magnitude Xr between the previously detected image data D(n−1) and the currently detected image data D(n) in the right area 113 among the divided blur detection areas using a known correlation operation (Step S305).

Then, the CPU 1 compares the image shift magnitude Xl in the left area 111 among the divided blur detection areas with the blur reference value Xb (Step S306). If the image shift magnitude Xl is larger than the blur reference value Xb, it proceeds to Step S307. If the image shift magnitude Xl is smaller than or equal to the blur reference value Xb, it proceeds to Step S314.

If the image shift magnitude Xl is larger at Step S306, the CPU 1 compares the image shift magnitude Xr in the right area 113 among the divided blur detection areas with the blur reference value Xb (Step S307). If the image shift magnitude Xr is larger than the blur reference value Xb, it proceeds to Step S308. If the image shift magnitude Xr is smaller than or equal to the blur reference value Xb, it proceeds to Step S314.

If the image shift magnitude Xr is larger at Step S307, the CPU 1 compares the image shift magnitude Xc in the center area 112 among the divided blur detection areas with the blur reference value Xb (Step S308). If the image shift magnitude Xc is larger than the blur reference value Xb, the image shift magnitude is large throughout the photograph frame 114. Thus, the CPU 1 assumes that blur is present and proceeds to Step S309.

If the image shift magnitude Xc is smaller than or equal to the blur reference value Xb, the image shift magnitudes are large in the periphery of the photograph frame 114 where miscellaneous subjects are highly likely present and the image shift magnitude is small in the center part where a main subject 116 is highly likely present. Thus, the CPU 1 assumes blur is absent and miscellaneous subjects in the periphery of the photograph frame 114 are moving, ends the blur detection, and returns.

If the image shift magnitude Xc is larger at Step S308, the CPU 1 sets the blur flag (f_blur) (Step S309).

Then, the CPU 1 compares the image shift magnitude Xl in the left area 111 among the divided blur detection areas with the compositional arrangement change reference value Xch (Step S310). If the image shift magnitude Xl is larger than the compositional change reference value Xch, it proceeds to Step S311. If the image shift magnitude Xl is smaller than or equal to the compositional change reference value Xch, it ends the blur detection and returns.

If the image shift magnitude Xl is larger at Step S310, the CPU 1 compares the image shift magnitude Xr in the right area 113 among the divided blur detection areas with the compositional arrangement change reference value Xch (Step S311). If the image shift magnitude Xr is larger than the compositional change reference value Xch, it proceeds to Step S312. If the image shift magnitude Xr is smaller than or equal to the compositional change reference value Xch, it ends the blur detection and returns.

If the image shift magnitude Xr is larger at Step S311, the CPU 1 compares the image shift magnitude Xc in the center area 112 among the divided blur detection areas with the compositional arrangement change reference value Xch (Step S312). If the image shift magnitude Xc is larger than the compositional change reference value Xch, the image shift magnitude throughout the photograph frame 114 is larger than that of normal blur. Thus, the CPU 1 assumes that photographic compositional arrangement is being changed and proceeds to Step S313.

If the image shift magnitude Xc is smaller than or equal to the compositional arrangement change reference value Xch in Step S312, the image shift magnitudes in the periphery of the photograph frame 114 where miscellaneous subjects are highly likely present are larger than that of normal blur and the image shift magnitude in the center of the photograph frame 114 where main subjects 116 are highly likely present is as large as that of normal blur. Thus, the CPU 1 assumes that miscellaneous subjects in the periphery of the photograph frame 114 are moving and blur is present as well, ends the blur detection, and returns.

If the image shift magnitude Xc is larger at Step S312, the CPU 1 sets the compositional arrangement change flag (f_change) (Step S313) and returns.

Proceeding to Step S314 from Step S306 or S307, the CPU 1 compares the image shift magnitude Xc in the center area 112 among the divided blur detection areas with the blur reference value Xb (Step S314). If the image shift magnitude Xc is larger than the blur reference value Xb, the CPU 1 assumes blur is absent, but the main subject 116 in the center of the photograph frame 114 is moving. If a photograph is taken in this circumstance, the obtained photograph will include a blurred subject Therefore, the CPU 1 proceeds to Step S315.

If the image shift magnitude Xc is smaller or equal to the blur reference value Xb in step 314, the CPU 1 assumes that blur is absent ends the blur detection, and returns.

If the image shift magnitude Xc is larger at Step S314, the CPU 1 sets the blur flag (f_blur) (Step S316) and returns. Proceeding to Step S316 from Step S302, the CPU 1 detects the image shift magnitude Xc between the previously detected image data D(n−1) and the currently detected image data D(n) in the center area 112 among the divided blur detection areas (Step S316).

Then, the CPU 1 compares the image shift magnitude Xc in the center area 112 among the divided blur detection areas with the blur reference value Xb (Step S317). If the image shift magnitude Xc is larger than the blur reference value Xb, the CPU 1 assumes that blur is present or the main subject 116 is moving and proceeds to Step S318.

If the image shift magnitude Xc is smaller or equal to the blur reference value Xb in step S317, the CPU 1 assumes that blur is absent and the main subject 116 is not moving, ends the blur detection, and returns.

If the image shift magnitude Xc is larger at Step S317, the CPU 1 sets the blur flag (f_blur) (Step S318). Then, the CPU 1 compares the image shift magnitude Xc in the center area 112 among the divided blur detection areas with the compositional arrangement change reference value Xch (Step S319). If the image shift magnitude Xc is larger than the compositional arrangement change reference value Xch, the image shift magnitude is larger than that of normal blur. Thus, the CPU 1 assumes that photographic compositional arrangement is being changed and proceeds to Step S320.

If the image shift magnitude Xc is smaller or equal to the compositional arrangement change reference value Xch in step S319, the CPU 1 assumes that blur is present, ends the blur detection, and returns.

If the image shift magnitude Xc is larger at Step S319, the CPU 1 sets the compositional arrangement change flag (f_change) (Step S320) and returns.

As described above, the present invention gives blur warnings when the blur mode is selected in scenes where blur is concerned so that the photographer recognizes blur. Blurred, unsuccessful photographs are more likely avoided.

As described above, the present invention provides a blur detection apparatus with improved precision of blur detection.

What is claimed is:

1. A blur detection apparatus for detecting vibrations of a camera comprising:

an AF sensor having plural divided areas; and a blur detection part for comparing subject image data provided from said AF sensor at a specified time interval and evaluating vibrations in each of said areas for blur detection wherein:

said blur detection part does not assume that blur is present when the image shift magnitude in the center area among said plural areas is smaller than a blur reference value even though the image shift magnitudes in the periphery areas are larger than said blur reference value.

2. A-blur detection apparatus for detection vibrations of a camera comprising:

an AF sensor having plural divided areas; and a blur detection part for comparing subject image data provided from said AF sensor at a specified time interval and evaluating vibrations in each of said area for blur detection wherein:

said blur detection part assumes that blur is present when the image shift magnitude in the center area among said plural areas is larger than a blur reference value even though the image shift magnitudes in periphery areas are smaller than said blur reference value.

3. A blur detection for detecting vibrations of a camera comprising:

an AF sensor having plural divided areas; and a blur detection part for comparing subject image data provided from said AF sensor at a specified time interval and evaluating vibrations in each of said area for blur detection wherein:

said blur detection part is adapted to change the areas that are used for blur detection depending on a focal length of a lens of the camera.

4. A blur detection apparatus for detecting vibrations of a camera comprising:

an AF sensor having plural divided areas; and a blur detection part for comparing subject image data provided from said AF sensor at a specified time interval and evaluating vibrations in each of said areas for blur detection wherein:

said blur detection part is adapted to change the to areas that are used for blur detection depending on a selected one of the camera's photographic modes and uses only an image shift magnitude in the center area for blur detection when the camera is in a spot mode or portrait photographic mode.

5. A blur detection apparatus for detecting vibrations of a camera comprising:

an AF sensor having plural divided areas; and a blur detection part for comparing subject image data provided from said AF sensor at a specified time interval and evaluating vibrations in each of said areas for blur detection wherein:

said blur detection part is adapted to change the areas that are used for blur detection depending on a selected one of the camera's photographic modes and uses image shift magnitudes in all the areas of said AF sensor when the camera is in a scenery photographic mode.

6. The blur detection apparatus according to claim 3 wherein:

said blur detection part uses only the image shift magnitude in the center area for blur detection when the camera lens has the larger focal length.

7. A blur detection apparatus for a camera comprising:

a lens through which light from a subject passes, and having a focal plane;

a light receiving element including a light receiving surface which is located on the focal plane of said lens; and an operation part for evaluating blur in said camera using positional shifts of images in plural areas of the light receiving surface of said light receiving element which images are detected at different times, wherein:

areas on said light receiving surface used for detecting blur due to compositional arrangement change are changed according to changes in focal lengths of the camera lens.

8. A blur detection apparatus for detecting vibrations of a camera comprising:

an AF sensor having plural divided areas;

a blur detection part for comparing subject image data provided from said AF sensor at a specified time interval and evaluating vibrations in each of said areas for blur detection;

a second sensor for mechanically detecting movements of the camera; and an operation part for detecting blur in the camera by selecting one of the AF sensor and the second sensor depending on at least one of a brightness and a contrast of the subject.

9. The blur detection apparatus according to claim 8, wherein the second sensor is an acceleration sensor.

* * * * *